(12) United States Patent
Muto et al.

(10) Patent No.: US 10,844,803 B2
(45) Date of Patent: Nov. 24, 2020

(54) ABNORMALITY DETECTION DEVICE FOR AIR-FUEL RATIO SENSOR, ABNORMALITY DETECTION SYSTEM FOR AIR-FUEL RATIO SENSOR, DATA ANALYSIS DEVICE, AND CONTROL DEVICE FOR INTERNAL COMBUSTION ENGINE

(71) Applicant: TOYOTA JIDOSHA KABUSHIKI KAISHA, Toyota (JP)

(72) Inventors: Harufumi Muto, Miyoshi (JP); Akihiro Katayama, Toyota (JP); Kohei Mori, Toyota (JP); Yosuke Hashimoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/819,363

(22) Filed: Mar. 16, 2020

(65) Prior Publication Data
US 2020/0300193 A1 Sep. 24, 2020

(30) Foreign Application Priority Data
Mar. 22, 2019 (JP) .................................. 2019-055229

(51) Int. Cl.
*B60T 7/12* (2006.01)
*F02D 41/22* (2006.01)
(Continued)

(52) U.S. Cl.
CPC ............. *F02D 41/222* (2013.01); *F01N 3/28* (2013.01); *F01N 11/007* (2013.01);
(Continued)

(58) Field of Classification Search
USPC ........ 123/688; 701/102–104, 114; 73/114.42
See application file for complete search history.

(56) References Cited

U.S. PATENT DOCUMENTS

2006/0025966 A1 2/2006 Kanamaru
2010/0186491 A1 7/2010 Shibata et al.
(Continued)

FOREIGN PATENT DOCUMENTS

JP 04-091348 A 3/1992
JP 10-252536 A 9/1998
(Continued)

*Primary Examiner* — John Kwon
(74) *Attorney, Agent, or Firm* — Oblon, McClelland, Maier & Neustadt, L.L.P.

(57) ABSTRACT

An abnormality detection device for an air-fuel ratio sensor is provided. An air-fuel ratio sensor is provided in an exhaust passage. A storage device stores mapping data specifying a mapping. The mapping outputs an abnormality determination variable using first time series data and second time series data as an input. The first time series data is time series data of an excess amount variable in a first predetermined period. The excess amount variable is a variable corresponding to an excess amount of fuel actually discharged to the exhaust passage in relation to an amount of fuel reacting without excess or deficiency with oxygen contained in a fluid discharged to the exhaust passage. The second time series data is time series data of an air-fuel ratio detection variable in a second predetermined period.

15 Claims, 7 Drawing Sheets

(51) Int. Cl.
  *F02D 41/24* (2006.01)
  *F02M 25/08* (2006.01)
  *F02D 41/00* (2006.01)
  *F02M 26/13* (2016.01)
  *F02D 13/02* (2006.01)
  *F01N 3/28* (2006.01)
  *F02D 41/14* (2006.01)
  *F01N 11/00* (2006.01)
  *F02B 37/18* (2006.01)

(52) U.S. Cl.
  CPC ........ *F02B 37/183* (2013.01); *F02D 13/0223* (2013.01); *F02D 41/0032* (2013.01); *F02D 41/0077* (2013.01); *F02D 41/1441* (2013.01); *F02D 41/2409* (2013.01); *F02M 25/0836* (2013.01); *F02M 25/0854* (2013.01); *F02M 25/0872* (2013.01); *F02M 26/13* (2016.02); *F02D 2200/0614* (2013.01)

(56) References Cited

U.S. PATENT DOCUMENTS

| | | |
|---|---|---|
| 2010/0235070 A1 | 9/2010 | Amano |
| 2010/0324802 A1 | 12/2010 | Ogiso et al. |
| 2012/0006307 A1* | 1/2012 | Demura .............. F02D 41/2454 123/674 |
| 2012/0160022 A1* | 6/2012 | Kimura .............. F02D 41/1441 73/114.72 |
| 2012/0173116 A1* | 7/2012 | Iwazaki .............. F02D 41/1456 701/101 |
| 2012/0277979 A1* | 11/2012 | Kato ................... F02D 41/3094 701/104 |
| 2013/0036808 A1* | 2/2013 | Kitaura ................ F01N 3/101 73/114.75 |
| 2013/0180322 A1* | 7/2013 | Kitaura .............. F02D 41/1441 73/114.75 |
| 2013/0197786 A1* | 8/2013 | Genko ................... F02D 41/00 701/108 |
| 2014/0007856 A1* | 1/2014 | Tsuruoka ............ F02D 41/1498 123/704 |

FOREIGN PATENT DOCUMENTS

| | | |
|---|---|---|
| JP | 2005-188501 A | 7/2005 |
| JP | 2009-002280 A | 1/2009 |
| JP | 2010-037982 A | 2/2010 |
| JP | 2010-216351 A | 9/2010 |
| JP | 2011-001880 A | 1/2011 |
| JP | 2018-003702 A | 1/2018 |
| WO | WO 2014/125748 A1 | 8/2014 |

* cited by examiner

ABNORMALITY DETECTION DEVICE FOR AIR-FUEL RATIO SENSOR, ABNORMALITY DETECTION SYSTEM FOR AIR-FUEL RATIO SENSOR, DATA ANALYSIS DEVICE, AND CONTROL DEVICE FOR INTERNAL COMBUSTION ENGINE

BACKGROUND

1. Field

The present disclosure relates to an abnormality detection device for an air-fuel ratio sensor, an abnormality detection system for an air-fuel ratio sensor, a data analysis device, a control device for an internal combustion engine, and a method for detecting an abnormality of an air-fuel ratio sensor.

2. Description of Related Art

Japanese Laid-Open Patent Publication No. 2009-2280 describes an example of a control device that detects a point in time at which the air-fuel ratio starts to greatly change based on, for example, changes in depression of the accelerator. Detection of such a point in time causes the control device to sequentially accumulate a difference value between the previous value and the current value of the calculated air-fuel ratio. The calculated air-fuel ratio is calculated from the fuel injection amount and the intake air amount. When the integrated value of the difference values is greater than or equal to a predetermined value and if the detection value of the air-fuel ratio sensor is less than or equal to a responsiveness abnormality determination value, the control device determines that the responsiveness of the air-fuel ratio sensor is abnormal.

The control device described above merely compares the responsiveness abnormality determination value with the detection value of the air-fuel ratio sensor when the integrated value is greater than or equal to the predetermined value. Hence, before the integrated value reaches the predetermined value, the above-described control device cannot utilize information indicated by the detection value of the air-fuel ratio sensor to determine whether the abnormality is present or absent.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Hereinafter, examples will be described.

Example 1

An abnormality detection device is for an air-fuel ratio sensor provided in an exhaust passage of an internal combustion engine. The abnormality detection device includes a storage device and an execution device. The storage device stores mapping data specifying a mapping. The mapping outputs an abnormality determination variable using first time series data and second time series data as an input. The first time series data is time series data of an excess amount variable in a first predetermined period. The excess amount variable is a variable corresponding to an excess amount of fuel actually discharged to the exhaust passage in relation to an amount of fuel reacting without excess or deficiency with oxygen contained in a fluid discharged to the exhaust passage. The second time series data is time series data of an air-fuel ratio detection variable in a second predetermined period. The air-fuel ratio detection variable is a variable related to a detection value of the air-fuel ratio sensor. The abnormality determination variable is a variable related to presence and absence of an abnormality that decreases responsiveness of the air-fuel ratio sensor. The execution device is configured to execute an acquisition process, a calculation process, and a handling process. In the acquisition process, the execution device acquires the first time series data and the second time series data. In the calculation process, the execution device inputs the first time series data and the second time series data, which are acquired by the acquisition process, to the mapping to calculate a value of the abnormality determination variable. In the handling process, when the calculation result of the calculation process indicates the abnormality, the execution device operates a predetermined hardware to handle the abnormality.

In the configuration described above, the unburned fuel amount and the oxygen amount in the fluid to which the air-fuel ratio sensor is exposed are recognized from the first time series data. The behavior of the detection value of the air-fuel ratio sensor is recognized from the second time series data. This allows for calculation of the value of the abnormality determination variable. In particular, the value of the abnormality determination variable is calculated based on the second time series data. Thus, the configuration described above calculates the value of the abnormality determination variable based on more detailed information related to the behavior of the detection value of the air-fuel ratio sensor, for example, as compared to a configuration in which the abnormality determination is made based on whether or not the detection value of the air-fuel ratio sensor reaches a predetermined value within a predetermined period. Therefore, whether the abnormality is present or absent is determined based on the more detailed information related to the behavior of the detection value of the air-fuel ratio sensor.

Example 2

In the abnormality detection device according to example 1, the air-fuel ratio detection variable includes a temporally-varying variable. The temporally-varying variable is a variable related to temporal variation of the detection value in a sampling period for a value of each air-fuel ratio detection variable configuring the second time series data.

Only the temporally-varying variable is used to indicate changes in the detection value of the air-fuel ratio sensor. The above configuration uses the temporally-varying variable so that whether the abnormality is present or absent is determined based on more detailed information regarding the behavior of the detection value of the air-fuel ratio sensor, for example, as compared to a configuration in which each time series data is used as a detection value.

Example 3

In the abnormality detection device according to example 1 or 2, the air-fuel ratio detection variable includes a difference variable. The difference variable ($\Delta Afu$) is a variable related to a difference between a local maximum of the detection value ($Afu$) and a local minimum of the detection value (Afu) in a sampling period for a value of each air-fuel ratio detection variable configuring the second time series data.

Only the difference variable is used to indicate changes in the detection value of the air-fuel ratio sensor. The above configuration uses the difference variable so that whether the abnormality is present or absent is determined based on more detailed information regarding the behavior of the detection value of the air-fuel ratio sensor, for example, as compared to a configuration in which each time series data is used as a detection value.

Example 4

In the abnormality detection device according to any one of examples 1 to 3, the excess amount variable is determined based on an actual amount of fuel injected by a fuel injection valve of the internal combustion engine.

In the above configuration, the excess amount variable is based on the actual amount of fuel injected. Thus, the excess amount variable expresses, with high accuracy, the excess amount of fuel that is actually discharged to the exhaust passage in relation to the amount of fuel that reacts without excess or deficiency with oxygen contained in the fluid discharged to the exhaust passage.

Example 5

In the abnormality detection device according to any one of examples 1 to 4, the internal combustion engine includes a canister configured to collect fuel vapor from a fuel tank, the fuel tank storing fuel that is to be injected from a fuel injection valve, a purge passage configured to connect the canister to an intake passage of the internal combustion engine, and an adjustment device configured to adjust a flow rate of the fuel vapor, the fuel vapor flowing into the intake passage from the canister through the purge passage. The excess amount variable includes a purge variable that is a variable related to the flow rate of the fuel vapor.

When fuel vapor flows from the canister into the intake passage, the fuel vapor affects the controllability of the air-fuel ratio of the air-fuel mixture in the combustion chamber. Ultimately, this may cause changes in the amount of oxygen and the amount of unburned fuel discharged into the exhaust passage. In this regard, in the above configuration, the purge variable is used to configure the excess amount variable. More specifically, the excess amount variable may be a combination of multiple variables including the purge variable, which is a variable related to the flow rate of the fuel vapor. This allows for calculation of the value of the abnormality determination variable reflecting the effect of the fuel vapor.

Example 6

In the abnormality detection device according to any one of examples 1 to 5, the internal combustion engine includes a forced induction device upstream of the air-fuel ratio sensor in the exhaust passage. The exhaust passage includes a bypass passage that bypasses the forced induction device. The bypass passage has a flow path cross-sectional area that is adjusted by a wastegate valve. The input to the mapping includes a flow path variable that is a variable related to the flow path cross-sectional area of the bypass passage. The acquisition process includes a process that acquires the flow path variable. The calculation process includes a process that calculates the value of the abnormality determination vari-able based on an output of the mapping in which the flow path variable is further included in the input to the mapping.

When the opening degree of the wastegate valve differs, the flow state of the fluid flowing toward the air-fuel ratio sensor side may differ. The responsiveness of an air-fuel ratio sensor may differ in accordance with the flow state of the fluid. In this regard, in the above configuration, the value of the abnormality determination variable is calculated based on the output of the mapping that further includes the flow path variable as the input to the mapping. This allows for calculation of the value of the abnormality determination variable reflecting the effect of the flow state of the fluid on the responsiveness of the air-fuel ratio sensor.

Example 7

In the abnormality detection device according to any one of examples 1 to 6, the internal combustion engine includes an exhaust gas recirculation (EGR) passage configured to connect the exhaust passage to an intake passage and an EGR valve configured to adjust a flow rate of a fluid flowing from the exhaust passage into the intake passage through the EGR passage. The input to the mapping includes an EGR variable that is a variable related to the flow rate of the fluid flowing into the intake passage from the exhaust passage. The acquisition process includes a process that acquires the EGR variable. The calculation process includes a process that calculates the value of the abnormality determination variable based on an output of the mapping in which the EGR variable is further included in the input to the mapping.

Components of the fluid to which the air-fuel ratio sensor is exposed vary in accordance with the flow rate of the fluid flowing from the exhaust passage to the intake passage through the exhaust gas recirculation (EGR) passage. Consequently, this may affect the detection value of the air-fuel ratio sensor. In this regard, in the above configuration, the value of the abnormality determination variable is calculated based on the output of the mapping that further includes the EGR variable as the input to the mapping. This allows for calculation of the value of the abnormality determination variable reflecting the effect on the detection value of the air-fuel ratio sensor caused by the flow rate of the exhaust air flowing from the exhaust passage to the intake passage through the EGR passage.

Example 8

In the abnormality detection device according to any one of examples 1 to 7, the internal combustion engine includes a valve characteristic variable device configured to change a valve characteristic of an intake valve. The input to the mapping includes a valve characteristic variable that is a variable related to the valve characteristic. The acquisition process includes a process that acquires the valve characteristic variable. The calculation process includes a process that calculates the value of the abnormality determination variable based on an output of the mapping in which the valve characteristic variable is further included in the input to the mapping.

The internal EGR amount changes in accordance with the valve characteristics, and the components of the fluid to which the air-fuel ratio sensor is exposed vary in accordance with the internal EGR amount. Thus, the valve characteristics may affect the detection value of the air-fuel ratio sensor. In addition, scavenging may occur depending on the valve characteristics. Scavenging is a process in which air drawn from the intake passage is not subject to combustion in the combustion chamber and is discharged to the exhaust passage. The amount of air discharged to the exhaust passage through scavenging changes in accordance with the valve characteristics. The detection value of the air-fuel ratio sensor changes in accordance with the amount of air that is not subject to combustion and is discharged to the exhaust passage. In this regard, in the above configuration, the value of the abnormality determination variable is calculated based on the output of the mapping that further includes the valve characteristic variable as the input to the mapping. This allows for calculation of the value of the abnormality determination variable reflecting the effects of the internal EGR amount and the amount of air due to scavenging on the detection value of the air-fuel ratio sensor.

Example 9

In the abnormality detection device according to any one of examples 1 to 8, the calculation process includes a process that calculates the value of the abnormality determination variable based on the first time series data and the second time series data acquired by the acquisition process on condition that a flow rate of the fluid discharged to the exhaust passage is within a predetermined range.

The responsiveness of the air-fuel ratio sensor may differ in accordance with the flow rate of the fluid. Hence, when the flow rate of the fluid has various values and the value of the abnormality determination variable is calculated, requirements of a mapping are increased. This may complicate the structure of the mapping. In this regard, in the above configuration, the value of the abnormality determination variable is calculated based on the first time series data and the second time series data acquired when the flow rate of the fluid is within the predetermined range. The value of the abnormality determination variable is calculated with a mapping having a simple structure with high accuracy.

Example 10

In the abnormality detection device according to any one of examples 1 to 9, the exhaust passage is provided with a catalyst. The air-fuel ratio sensor is an upstream air-fuel ratio sensor disposed at an upstream side of the catalyst in the exhaust passage. A downstream air-fuel ratio sensor is provided at a downstream side of the catalyst in the exhaust passage. The execution device executes a main feedback process and a sub-feedback process. The main feedback process feedback-controls the detection value of the upstream air-fuel ratio sensor to a target value. When the detection value of the downstream air-fuel ratio sensor is richer than a stoichiometric air-fuel ratio by a predetermined amount or more, the sub-feedback process causes the target value to be leaner than the stoichiometric air-fuel ratio. When the detection value of the downstream air-fuel ratio sensor is leaner than the stoichiometric air-fuel ratio by a predetermined amount or more, the sub-feedback process causes the target value to be richer than the stoichiometric air-fuel ratio. In synchronization with a point in time when the target value is switched from rich to lean and a point in time when the target value is switched from lean to rich, the acquisition process sets the first predetermined period and sets the second predetermined period after the first predetermined period.

The responsiveness of the air-fuel ratio sensor is determined by the behavior of the detection value of the air-fuel ratio sensor corresponding to changes in the air-fuel ratio. In this regard, in the above configuration, a change in the target value is used as a trigger to determine the first predetermined period and the second predetermined period. A mapping that outputs the abnormality determination variable may be configured based on the behavior of the detection value corresponding to changes in the target value. Thus, in the above configuration, the value of the abnormality determination variable is calculated with high accuracy while simplifying the structure of mapping, for example, as compared to a configuration in which time series data is acquired from an arbitrary time point.

Example 11

In the abnormality detection device according to any one of examples 1 to 10, the storage device stores multiple types of mapping data as the mapping data. The calculation process includes a selection process. The selection process selects one of the multiple types of mapping data as mapping data that is used to calculate the value of the abnormality determination variable.

In any situation, when forming a mapping that is capable of outputting the value of the abnormality determination variable with high accuracy, the structure of the mapping is likely to be complicated. In this regard, in the above configuration, different types of mapping data are provided. This allows an appropriate mapping to be selected in accordance with differing situations. In this case, the structure of each of different types of mappings may be simpler than, for example, a case in which a single mapping is used in all situations.

Example 12

An abnormality detection system is for an air-fuel ratio sensor. The abnormality detection system includes the execution device and the storage device according to any one of examples 1 to 11. The execution device includes a first execution device and a second execution device. The first execution device is mounted on a vehicle and configured to execute the acquisition process, a vehicle-side transmission process, a vehicle-side reception process, and the handling process. In the vehicle-side transmission process, the first execution device transmits data acquired by the acquisition process to outside the vehicle. In the vehicle-side reception process, the first execution device receives a signal based on the value of the abnormality determination variable calculated by the calculation process. The second execution device is disposed outside the vehicle and configured to execute an external-side reception process, the calculation process, and an external-side transmission process. In the external-side reception process, the second execution device receives the data transmitted by the vehicle-side transmission process. In the external-side transmission process, the second execution device transmits the signal based on the value of the abnormality determination variable calculated by the calculation process to the vehicle.

In the above configuration, the calculation process is executed outside the vehicle. This reduces the calculation load of the in-vehicle device.

Example 13

A data analysis device includes the second execution device and the storage device according to example 12.

Example 14

A control device for an internal combustion engine includes the first execution device according to example 12.

Example 15

A method for detecting an abnormality of an air-fuel ratio sensor causes a computer to execute the acquisition process, the calculation process, and the handling process according to any one of examples 1 to 11.

According to the above method, the same operation and effect as Example 1 are obtained.

Example 16

A non-transitory computer-readable storage medium stores a program of a process that detects an abnormality of an air-fuel ratio sensor. The program causes a computer to execute the acquisition process, the calculation process, and the handling process according to any one of examples 1 to 11.

Example 17

A system is for detecting an abnormality of an air-fuel ratio sensor provided in an exhaust passage of an internal combustion engine. The system includes the execution device and the storage device according to any one of examples 1 to 11. The execution device includes a first execution device, a second execution device, and a storage device. The storage device stores mapping data specifying a mapping. The mapping outputs an abnormality determination variable using first time series data and second time series data as an input. The first time series data is time series data of an excess amount variable in a first predetermined period. The excess amount variable is a variable corresponding to an excess amount of fuel actually discharged to the exhaust passage in relation to an amount of fuel reacting without excess or deficiency with oxygen contained in a fluid discharged to the exhaust passage. The second time series data is time series data of an air-fuel ratio detection variable in a second predetermined period. The air-fuel ratio detection variable is a variable related to a detection value of the air-fuel ratio sensor. The abnormality determination variable is a variable related to presence and absence of an abnormality that decreases responsiveness of the air-fuel ratio sensor. The first execution device is mounted on a vehicle and configured to execute the acquisition process, a vehicle-side transmission process, a vehicle-side reception process, and a handling process. In the acquisition process, the first execution device acquires the first time series data and the second time series data. In the vehicle-side transmission process, the first execution device transmits data acquired by the acquisition process to outside the vehicle. In the vehicle-side reception process, the first execution device receives a signal based on a value of the abnormality determination variable calculated by the calculation process. In the handling process, when the calculation result of the calculation process indicates the abnormality, the first execution device operates predetermined hardware to handle the abnormality. The second execution device is disposed outside the vehicle and configured to execute an external-side reception process, the calculation process, and an external-side transmission process. In the external-side reception process, the second execution device receives the data transmitted by the vehicle-side transmission process. In the calculation process, the second execution device inputs the first time series data and the second time series data, which are acquired by the acquisition process, to the mapping to calculate the value of the abnormality determination variable. In the external-side transmission process, the second execution device transmits the signal based on the value of the abnormality determination variable calculated by the calculation process to the vehicle.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Hereinafter, a first embodiment of an abnormality detection device of an air-fuel ratio sensor in accordance with the present disclosure will be described with reference to FIGS. 1 to 3.

Figure 1:
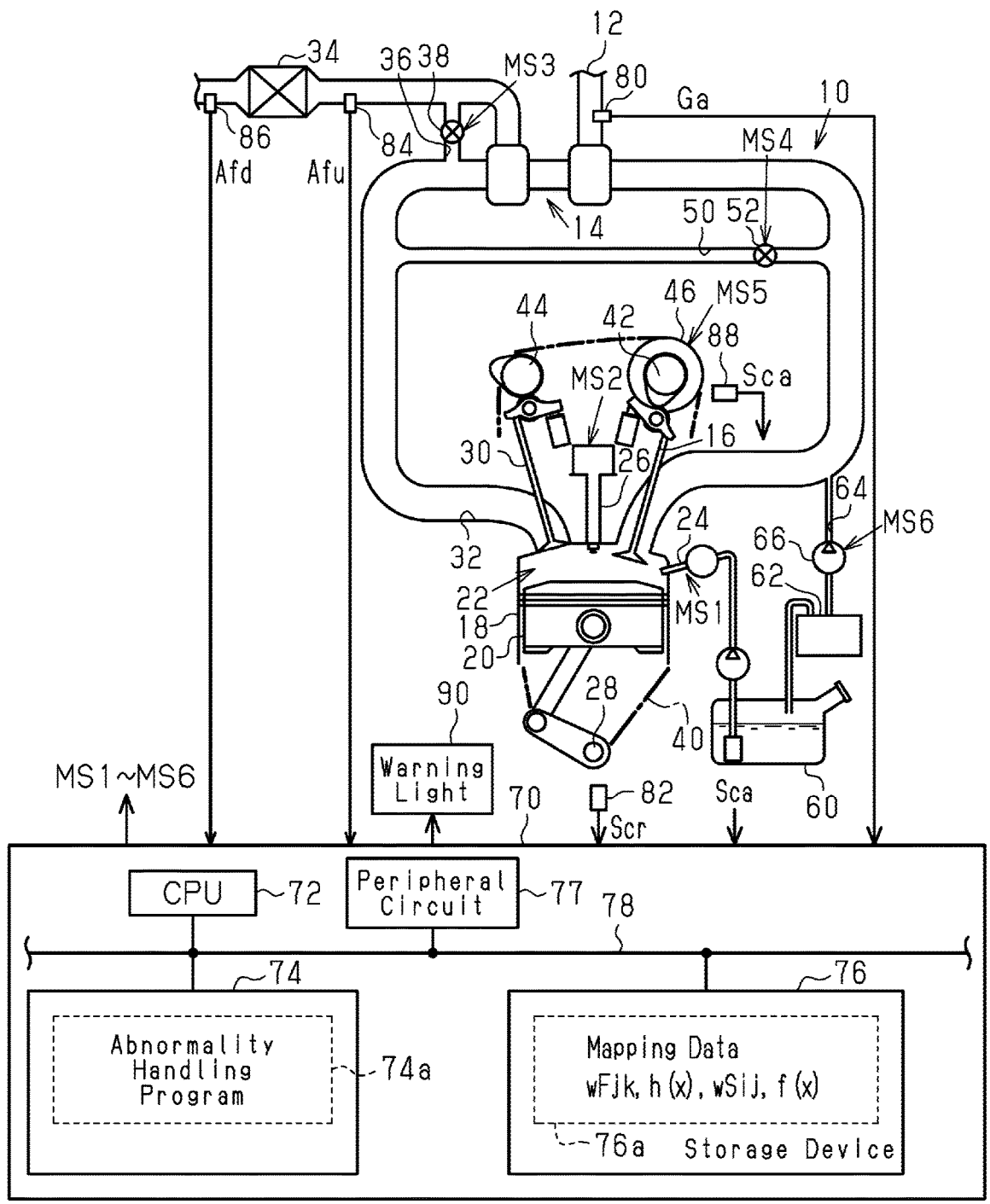
FIG. 1 is a diagram showing the configuration of a control device and a drive system of a vehicle according to a first embodiment.

FIG. 1 shows a control device and an internal combustion engine according to the present embodiment.

As shown in FIG. 1, air is drawn in from an intake passage 12 of an internal combustion engine 10 and flows into the downstream side of the intake passage 12 through a forced induction device 14. When an intake valve 16 is open, the air flows from the downstream side of the intake passage 12 into a combustion chamber 22 that is defined by a cylinder 18 and a piston 20. Fuel is injected into the combustion chamber 22 by a fuel injection valve 24. In the combustion chamber 22, the air-fuel mixture is subject to combustion with a spark discharge of an ignition device 26. The energy generated by the combustion is converted into rotational energy of a crankshaft 28 through the piston 20. When an exhaust valve 30 is open, the air-fuel mixture subjected to combustion is discharged to an exhaust passage 32 as exhaust air. A three-way catalyst (catalyst) 34 that is capable of storing oxygen is provided downstream of the forced induction device 14 in the exhaust passage 32. The exhaust passage 32 further includes a bypass passage 36 that bypasses the forced induction device 14. The bypass passage 36 is provided with a wastegate valve (WGV) 38 that adjusts the flow path cross-sectional area of the bypass passage 36.

The rotational power of the crankshaft 28 is transmitted to an intake side camshaft 42 and an exhaust side camshaft 44 through a timing chain 40. In the present embodiment, the power of the timing chain 40 is transmitted to the intake side camshaft 42 through a variable valve timing device 46. The variable valve timing device 46 is an actuator that adjusts the rotational phase difference between the crankshaft 28 and the intake side camshaft 42 to adjust the valve opening timing of the intake valve 16.

The intake passage 12 is connected to the exhaust passage 32 via an exhaust gas recirculation (EGR) passage 50. The EGR passage 50 is provided with an EGR valve 52 that adjusts the flow path cross-sectional area of the EGR passage 50.

The fuel stored in the fuel tank 60 is supplied to the fuel injection valve 24. Fuel vapor generated in the fuel tank 60 is collected by a canister 62. The canister 62 is connected to the intake passage 12 through a purge passage 64. The purge passage 64 is provided with a pump 66 that discharges fluid from the side of the canister 62, that is, the upstream side of the purge passage 64, to the side of the intake passage 12, that is, the downstream side of the purge passage 64.

The control device 70 is configured to control the internal combustion engine 10 and operates the operating units of the internal combustion engine 10 such as the fuel injection valve 24, the ignition device 26, the WGV 38, the EGR valve 52, the variable valve timing device 46, and the pump 66 to control the control aspects of the internal combustion engine 10 such as the torque and the exhaust component ratio. FIG. 1 shows operation signals MS1 to MS6 of the fuel injection valve 24, the ignition device 26, the WGV 38, the EGR valve 52, the variable valve timing device 46, and the pump 66, respectively.

When controlling the control aspects, the control device 70 refers to an intake air amount Ga detected by an air flow meter 80 and an output signal Scr of a crank angle sensor 82. In addition, the control device 70 refers to an upstream detection value Afu detected by an upstream air-fuel ratio sensor 84 provided at the upstream side of the catalyst 34 in the exhaust passage 32, a downstream detection value Afd detected by a downstream air-fuel ratio sensor 86 provided at the downstream side of the catalyst 34, and an output signal Sca of a cam angle sensor 88.

The control device 70 includes a CPU 72, a ROM 74, a storage device 76, and a peripheral circuit 77, which are configured to communicate with each other through a local network 78. The storage device 76 is an electrically rewritable nonvolatile memory. The peripheral circuit 77 includes, for example, a circuit that generates a clock signal regulating an internal operation of the control device 70, a power supply circuit, and a reset circuit.

The control device 70 executes the controlling of the control aspects with a CPU 72 executing programs stored in a ROM 74.

Figure 2:
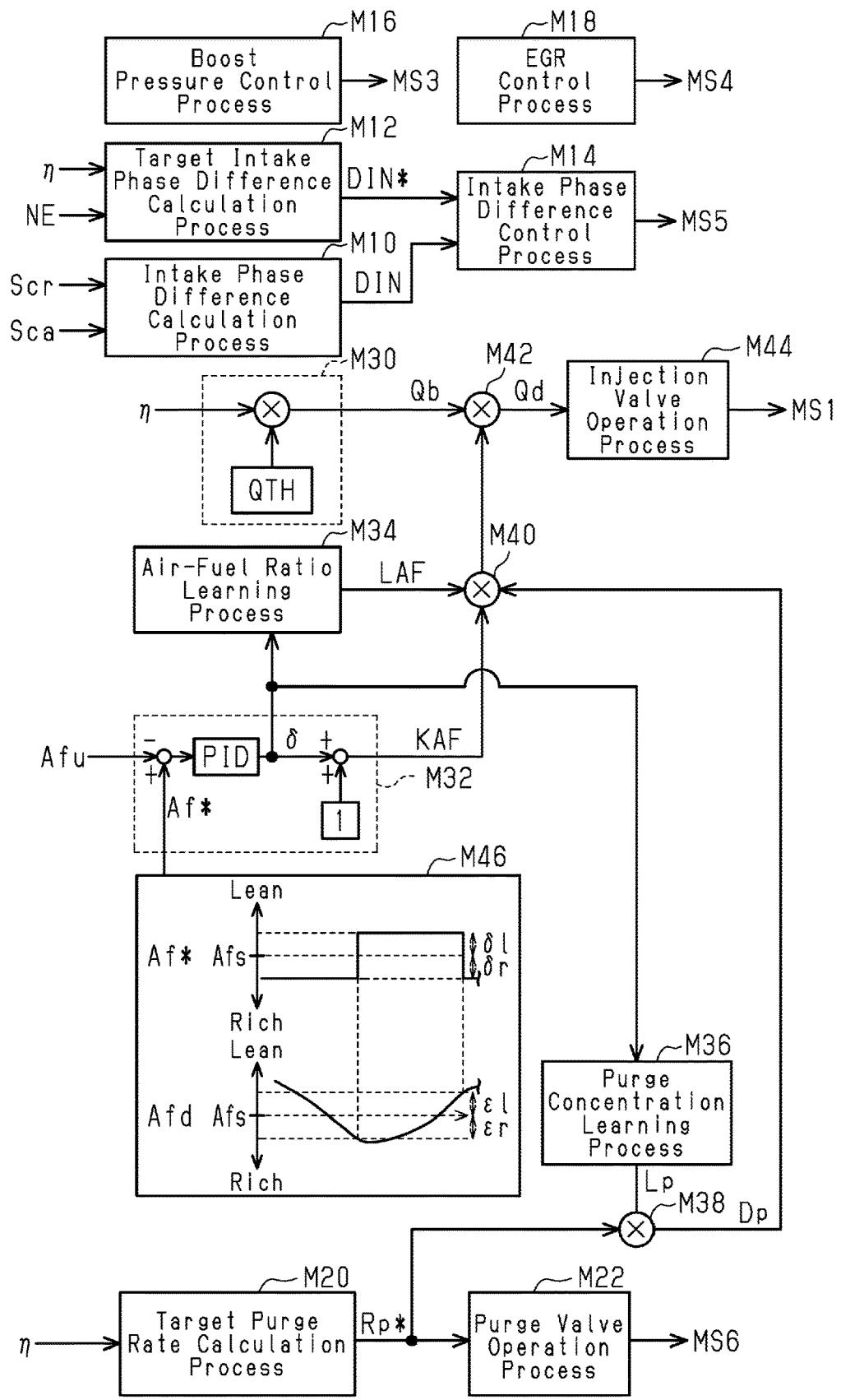
FIG. 2 is a block diagram showing some of the processes executed by a control device of the embodiment in the vehicle shown in FIG. 1.

FIG. 2 shows some of the processes implemented by the CPU 72 executing programs stored in the ROM 74.

An intake phase difference calculation process M10 calculates an intake phase difference DIN based on the output signal Scr of the crank angle sensor 82 and the output signal Sca of the cam angle sensor 88. The intake phase difference DIN is a phase difference of a rotational angle of the intake side camshaft 42 from the rotational angle of the crankshaft 28. A target intake phase difference calculation process M12 basically variably sets a target intake phase difference DIN* based on an operating point of the internal combustion engine 10. In the present embodiment, the operating point of the internal combustion engine 10 is defined by the rotational speed NE and the charging efficiency $\eta$. The CPU 72 calculates the rotational speed NE based on the output signal Scr of the crank angle sensor 82, and calculates the charging efficiency $\eta$ based on the rotational speed NE and the intake air amount Ga. The charging efficiency $\eta$ is a parameter that specifies the amount of air filled in the combustion chamber 22.

An intake phase difference control process M14 outputs the operation signal MS5 to the variable valve timing device 46 to operate the variable valve timing device 46 so that the intake phase difference DIN is controlled to reach the target intake phase difference DIN*.

Mainly when the load is large, a boost pressure control process M16 outputs the operation signal MS4 to the WGV 38 to operate the WGV 38 so that the opening degree $\theta w$ of the WGV 38 is decreased, thereby increasing the boost pressure.

Based on the operating point of the internal combustion engine 10, mainly when the load is small, an EGR control process M18 outputs the operation signal MS5 to the EGR valve 52 to operate the opening degree of the EGR valve 52 so that an EGR rate Regr is controlled to be a value that is greater than zero. The EGR rate Regr is a ratio of the flow rate of the exhaust air to the sum of the flow rate of air drawn into the intake passage 12 and the flow rate of exhaust air flowing into the intake passage 12 through the EGR passage 50.

A target purge rate calculation process M20 calculates a target purge rate Rp* based on the charging efficiency $\eta$. The purge rate is a value obtained by dividing the flow rate of the fluid flowing from the canister 62 into the intake passage 12 by the intake air amount Ga. The target purge rate Rp* is a target value of the purge rate in relation to control.

A purge valve operation process M22 outputs an operation signal MS6 to the pump 66 so as to operate the pump 66 to have the purge rate at the target purge rate Rp*.

A base injection amount calculation process M30 calculates a base injection amount Qb based on the charging efficiency $\eta$. The base injection amount Qb is a base value of the fuel amount that sets the air-fuel ratio of the air-fuel mixture in the combustion chamber 22 to the target air-fuel ratio. More specifically, for example, when the charging efficiency $\eta$ is expressed as a percentage, the base injection amount calculation process M30 may calculate the base injection amount Qb by multiplying the charging efficiency $\eta$ by the fuel amount QTH corresponding to 1% of the charging efficiency $\eta$ that sets the air-fuel ratio the target air-fuel ratio. The base injection amount Qb is a fuel amount that is calculated based on the amount of air filled into the combustion chamber 22 so that the air-fuel ratio is controlled to reach the target air-fuel ratio. In the present embodiment, the stoichiometric air-fuel ratio is exemplified as the target air-fuel ratio.

A main feedback process M32 adds one to the correction ratio δ to calculate a feedback correction coefficient KAF. The correction ratio δ is an operation amount that causes the upstream detection value Afu, which is a feedback control aspect, to reach the target value Af* through feedback control. The feedback correction coefficient KAF is a correction coefficient for the base injection amount Qb. When the correction ratio δ is zero, the base injection amount Qb is not corrected. When the correction ratio δ is greater than zero, the base injection amount Qb is corrected to be increased. When the correction ratio δ is less than zero, the base injection amount Qb is corrected to be decreased. In the present embodiment, the difference between the target value Af* and the upstream detection value Afu is input to each of a proportional element and a differentiation element, and an integral element outputs an integrated value of values corresponding to the difference. The sum of output values of the proportional element, the differentiation element, and the integral element is used as the correction ratio δ.

An air-fuel ratio learning process M34 sequentially updates the air-fuel ratio learning value LAF so that the deviation of the correction ratio δ from zero is decreased during an air-fuel ratio learning period. The air-fuel ratio learning process M34 includes a process that determines that, when the changing speed of the air-fuel ratio learning value LAF is less than or equal to a predetermined value, the air-fuel ratio learning value LAF has converged.

A purge concentration learning process M36 calculates a purge concentration learning value Lp based on the correction ratio δ. Inflow of fuel vapor from the canister 62 to the combustion chamber 22 may cause the base injection amount Qb to deviate from an injection amount that is needed to control the air-fuel ratio to reach the target air-fuel ratio. The purge concentration learning value Lp is a value obtained by converting a correction ratio that corrects the deviation of the base injection amount Qb from the necessary injection amount into a value corresponding to 1% of the purge rate. In the present embodiment, when the target purge rate Rp* is controlled to be greater than zero, the cause of deviation of the feedback correction coefficient KAF from one is considered as follows. It is considered that the deviation of the feedback correction coefficient KAF from one is entirely caused by the fuel vapor flowing from the canister 62 into the combustion chamber 22. More specifically, the correction ratio δ is considered as a correction ratio that corrects the deviation of the base injection amount Qb from the injection amount needed to control the air-fuel ratio to the target air-fuel ratio caused by the inflow of fuel vapor from the canister 62 into the intake passage 12. However, since the correction ratio δ is dependent on the purge rate, in the present embodiment, the purge concentration learning value Lp is set to an amount corresponding to a value "δ/Rp" that corresponds to 1% of the purge rate. More specifically, the purge concentration learning value Lp is an exponential moving average processing value of the value "δ/Rp" corresponding to 1% of the purge rate. It is desirable that the purge concentration learning process M36 be executed when the target purge rate Rp* is greater than zero on condition that it is determined that the air-fuel ratio learning value LAF has converged.

A purge correction ratio calculation process M38 multiplies the target purge rate Rp* by the purge concentration learning value Lp to calculate a purge correction ratio Dp. The purge correction ratio Dp is a value that is less than or equal to zero.

An addition process M40 adds the air-fuel ratio learning value LAF and the purge correction ratio Dp to the feedback correction coefficient KAF.

A request injection amount calculation process M42 multiplies the base injection amount Qb by the output value of the addition process M40 so that the base injection amount Qb is corrected to calculate the request injection amount Qd.

An injection valve operation process M44 outputs the operation signal MS1 to the fuel injection valve 24 so that the fuel injection valve 24 is operated based on the request injection amount Qd.

When the downstream detection value Afd is richer than the stoichiometric point Afs, which indicates the stoichiometric air-fuel ratio, by a predetermined amount εr or more, a sub-feedback process M46 causes the target value Af* to be leaner than the stoichiometric point Afs by the specified amount δ1. When the downstream detection value Afd is leaner than the stoichiometric point Afs by a predetermined amount ε1 or more, the sub-feedback process M46 causes the target value Af* to be richer than the stoichiometric point Afs by the specified amount δr.

A process for determining whether an abnormality of the upstream air-fuel ratio sensor 84 is present or absent will be described. In the description, the term "abnormality" refers to an abnormality that decreases the responsiveness of the upstream air-fuel ratio sensor 84.

Figure 3:
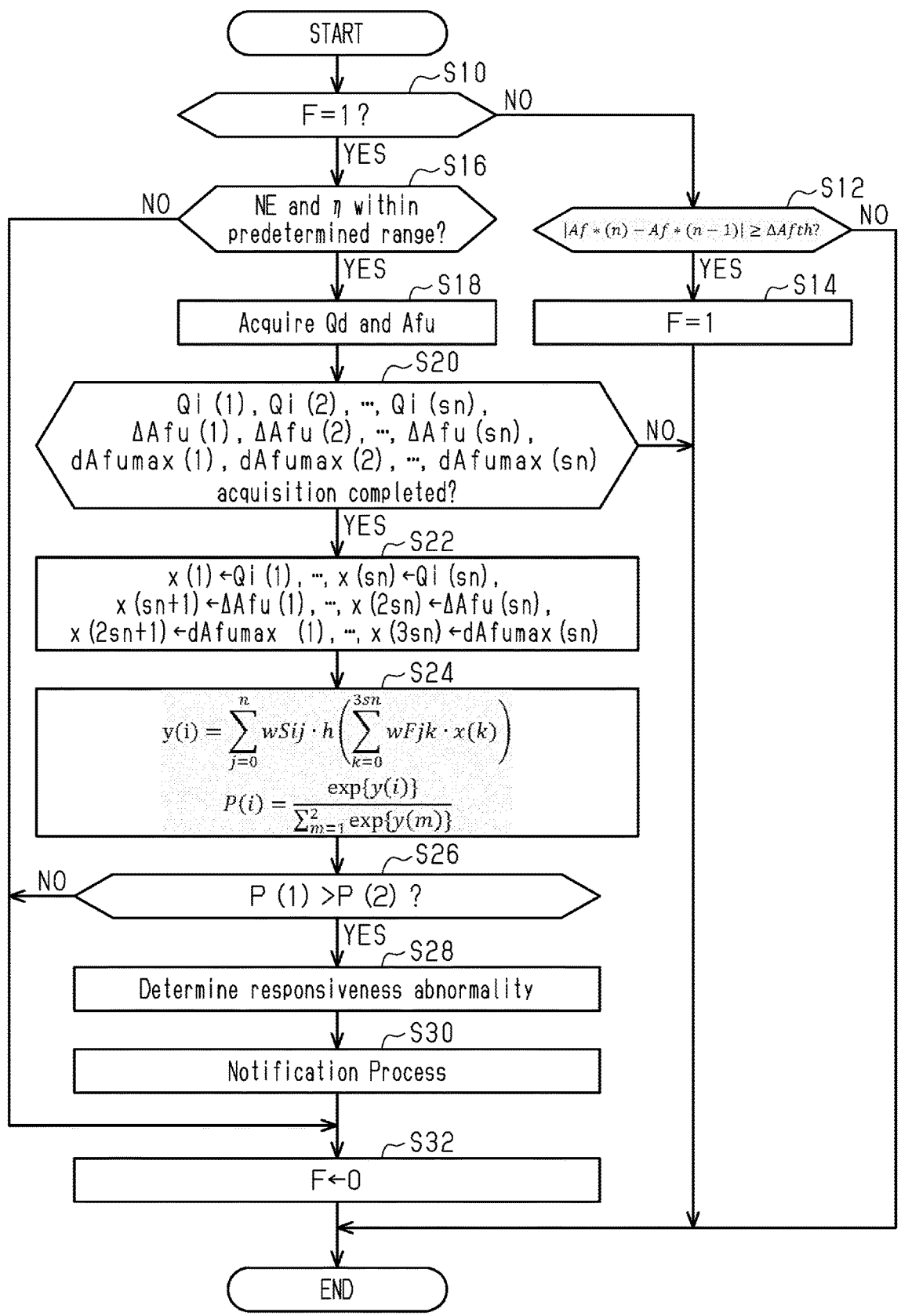
FIG. 3 is a flowchart showing the procedures of a process defined by an abnormality handling program of the embodiment in the vehicle shown in FIG. 1.

FIG. 3 shows the procedures of a process related to the determination on presence or absence of the abnormality of the upstream air-fuel ratio sensor 84. The process shown in FIG. 3 is implemented by the CPU 72 repeatedly executing the abnormality handling program 74a stored in the ROM 74 shown in FIG. 1, for example, in a predetermined cycle. Hereinafter, the step number of each process is represented by a numeral provided with "S" in front.

In the series of processes shown in FIG. 3, the CPU 72 determines whether or not the start flag F is one (S10). When the start flag F is one, it indicates that sampling of the sensor detection value, which is related to an input variable for determining the presence or absence of abnormality of the upstream air-fuel ratio sensor 84, is started. When the start flag is zero, it indicates the sampling is not started.

When it is determined that the start flag F is zero (S10: NO), the CPU 72 determines whether or not the absolute value of a value obtained by subtracting the previous value Af*(n−1) from the current value Af*(n) of the target value Af* is greater than or equal to a predetermined value ΔAfth (S12). The current value Af*(n) is the target value Af* used at the time of the current execution of the series of processes shown in FIG. 3. The previous value Af*(n−1) is the target value Af* used at the time of the previous execution of the series of processes shown in FIG. 3. The predetermined value ΔAfth is set to a value that is less than or equal to the sum of the specified amount δ1 and the specified amount δr.

For example, two states are considered including a state in which the target value Af* is leaner than the stoichiometric point Afs by a specified amount δ1, and a state in which the target value AT* is richer than the stoichiometric point Afs by a specified amount δr. For example, at the point in time when the state is switched from one of the two states to the other, the CPU 72 determines that the change amount in the target value Af* is greater than or equal to the predetermined value ΔAfth (S12: YES), and assigns one to the start flag F (S14).

When it is determined that the start flag F is one in S10 (S10: YES), the CPU 72 determines whether or not the operating point of the internal combustion engine 10 specified by the rotational speed NE and the charging efficiency η is within a predetermined range (S16). This process determines whether or not one of the conditions for executing the process for determining whether the abnormality of the upstream air-fuel ratio sensor 84 is present or absent is satisfied.

When it is determined that the operating point of the internal combustion engine 10 is within the predetermined range (S16: YES), the CPU 72 acquires the request injection amount Qd and the upstream detection value Afu (S18). In the present embodiment, the CPU 72 is configured to sample the upstream detection value Afu a number of times during an execution cycle, which is a time interval between times at which the process of S18 is executed. In the process of S18, for the upstream detection value Afu, the CPU 72 is configured to acquire multiple upstream detection values Afu that are sampled in a period from the time of execution of the previous process of S18 to the time of execution of the current process of S18. In the process of S18, the CPU 72 acquires the single latest value for the request injection amount Qd.

Then, the CPU 72 determines whether or not the acquisition of "sn" sampling values of the increase amount Qi, "sn" sampling values of the difference variable ΔAfu, and "sn" sampling values of the time difference maximum value dAfumax is completed (S20). The increase amount Qi is an excess amount of the actual fuel injection amount in relation to the fuel amount that is needed so that the air-fuel ratio of the air-fuel mixture in the combustion chamber 22 becomes the stoichiometric air-fuel ratio. In the present embodiment, "Qd−Qb·(1+LAF+Dp)" is the increase amount Qi. The increase amount Qi can be a negative value. In this case, the absolute value of the increase amount Qi indicates a deficit amount of the actual fuel injection amount in relation to the necessary fuel amount. The increase amount Qi is calculated whenever the process of S18 is executed once. That is, the increase amount Qi is sampled once in an execution cycle of the process of S18.

The difference variable ΔAfu is a difference between the local maximum (largest value) and the local minimum (smallest value) of the upstream detection values Afu in one cycle of the execution of the process of S18. The time difference maximum value dAfumax is the maximum value of the time difference values dAfu in one cycle of the execution of the process of S18. The time difference value dAfu is calculated from the difference between adjacent ones of the time series data of the upstream detection value Afu. The difference variable ΔAfu and the time difference maximum value dAfumax are calculated whenever the process of S18 is executed once. That is, the difference variable ΔAfu and the time difference maximum value dAfumax are sampled once in an execution cycle of the process of S18. When "m=1 to sn," for example, the difference variable ΔAfu (m) is the difference between the local maximum (largest value) and the local minimum (smallest value) of the upstream detection values Afu in the sampling period of each difference variable ΔAfu, which configures "sn" pieces of time series data of the difference variable ΔAfu, and there are multiples difference variables ΔAfu (m).

When the process of S18 is executed "sn" times within the period during which an affirmative determination is made in the process of S16, the CPU 72 determines that the acquisition of time series data configured by "sn" pieces of values of each variable is completed (S20: YES). When the process of S26 (described later) is executed, the CPU 72 deletes all of the "sn" pieces of values of each variable and initializes the number of values of each variable that have been acquired.

Then, the CPU 72 assigns the values of the variable, the acquisition of which is determined to be completed in the process of S20, to the input variables x(1) to x(3sn) of the mapping that outputs the abnormality determination variables P(1) and P(2) (S22). The abnormality determination variables P(1) and P(2) are variables that indicate presence or absence of the abnormality of the upstream air-fuel ratio sensor 84. More specifically, when m=1 to sn, the CPU 72 assigns the increase amount Qi(m) to the input variable x(m) of the mapping, assigns the difference variable ΔAfu(m) to the input variable x(sn+m) of the mapping, and assigns the time difference maximum value dAfumax(m) to the input variable x(2sn+m) of the mapping. When there is a high possibility that the abnormality is present, the abnormality determination variable P(1) has a greater value than when there is a low possibility that the abnormality is present. When there is a high possibility that the abnormality is absent, the abnormality determination variable P(2) has a greater value than when there is a low possibility that the abnormality is absent.

The mapping is specified by mapping data 76*a* stored in the storage device 76 shown in FIG. 1. The CPU 72 inputs the input variables x(1) to x(3sn) to the mapping specified by the mapping data 76*a* to calculate the values of the abnormality determination variables P(1) and P(2), which are output values of the mapping (S24).

In the present embodiment, this mapping is configured by a neural network including one intermediate layer. The neural network includes an activation function h(x), which serves as an input-side nonlinear mapping. The input-side nonlinear mapping performs a nonlinear conversion on each of the input side coefficient wFjk (j=0 to n, k=0 to 3 sn) and the output of the input side linear mapping, which is a linear mapping specified by the input side coefficient wFjk. In the present embodiment, a rectified linear unit (ReLU) is exemplified as the activation function h(x). ReLU is a function that outputs the non-lesser one of the input and zero. In addition, wFj0 is one of the bias parameters, and the input variable x(0) is defined as one.

The neural network includes a softmax function that outputs the abnormality determination variables P(1) and P(2). The softmax function uses each of the output side coefficient wSij (i=1 to 2, j=0 to n) and the determination prototype variables y(1) and y(2) as inputs, and outputs the abnormality determination variables P(1) and P(2). The determination prototype variables y(1) and y(2) are outputs of an output side linear mapping that is a linear mapping specified by the output side coefficient wSij.

The CPU 72 determines whether or not the value of the abnormality determination variable P(1) is greater than the value of the abnormality determination variable P(2) (S26). This process determines whether or not the upstream air-fuel ratio sensor 84 has an abnormality. When it is determined that the value of the abnormality determination variable P(1) is greater than the value of the abnormality determination variable P(2) (S26: YES), the CPU 72 determines that the upstream air-fuel ratio sensor 84 has an abnormality (S28). The CPU 72 executes a notification process, which is a process that operates the warning light 90 shown in FIG. 1 to prompt the user to repair (S30). The warning light 90 is an example of predetermined hardware that is operated to handle the abnormality.

When the process of S30 is completed or when a negative determination is made in the process of S16 or S26, the CPU 72 assigns zero to the start flag F (S32). When the process of S14 or S32 is completed or when a negative determination is made in the process of S12 or S20, the CPU 72 temporarily ends the series of processes shown in FIG. 3.

The input side coefficient wFjk and the output side coefficient wSij of the mapping data 76a are, for example, obtained in advance by learning, as training data, each variable used in the process of S22, for example, when running the internal combustion engine 10 with the upstream air-fuel ratio sensor 84 having a low responsiveness and the normal upstream air-fuel ratio sensor 84.

The operations and effects of the first embodiment will be described.

When the target value Af* is changed by the predetermined value ΔAfth or more, the CPU 72 is triggered to sample the request injection amount Qd and the upstream detection value Afu. Then, based on the sampled request injection amount Qd and the sampled upstream detection value Afu, the CPU 72 uses the time series data of the increase amount Qi, the time series data of the difference variable ΔAfu, and the time series data of the time difference maximum value dAfumax as input variables of the neural network to calculate the values of the abnormality determination variables P(1) and P(2).

The CPU 72 uses the time series data of the difference variable ΔAfu and the time series data of the time difference maximum value dAfumax as data for quantifying the behavior of the upstream detection value Afu. Taking into consideration that the behavior of the upstream detection value Afu varies in accordance with the increase amount Qi, the CPU 72 calculates the abnormality determination variables P(1) and P(2) as variables that indicate presence or absence of the abnormality of the upstream air-fuel ratio sensor 84. The abnormality determination variables P(1) and P(2) are calculated as variables that indicate presence or absence of the abnormality of the upstream air-fuel ratio sensor 84 with high accuracy.

The present embodiment described above further has the following operations and effects.

(1) The time series data of the time difference maximum value dAfumax is included in the input to the mapping. Only the time difference maximum value dAfumax is used to indicate changes in the upstream detection value Afu. In the present embodiment, the time difference maximum value dAfumax is used so that more detailed information about the behavior of the upstream detection value Afu is obtained, for example, as compared with a configuration in which each time series data is used as the upstream detection value Afu.

(2) The difference variable ΔAfu is included in the input to the mapping. Only the difference variable ΔAfu is used to indicate changes in the upstream detection value Afu. In the present embodiment, the difference variable ΔAfu is used so that more detailed information about the behavior of the upstream detection value Afu is obtained, for example, as compared to a configuration in which each time series data is used as the upstream detection value Afu.

(3) The values of the abnormality determination variables P(1) and P(2) are calculated based on the time series data acquired when the rotational speed NE and the charging efficiency η are both within the predetermined range. Since the flow rate of the fluid flowing into the side of the upstream air-fuel ratio sensor 84 in the exhaust passage 32 varies in accordance with the rotational speed NE and the charging efficiency η, the responsiveness of the upstream air-fuel ratio sensor 84 may vary in accordance with the flow rate of the fluid flowing in. Hence, when the flow rate of the fluid has various values and the values of the abnormality determination variables P(1) and P(2) are calculated, requirements of a mapping are increased. For example, the number of intermediate layers of the neural network may be increased, or the dimensions of input variables may be increased, which complicates the structure of the mapping. In this regard, in the present embodiment, the values of the abnormality determination variables P(1) and P(2) are calculated based on the time series data acquired when the rotational speed NE and the charging efficiency η are both within the predetermined range. The values of the abnormality determination variables P(1) and P(2) are calculated with high accuracy with the mapping having a simple structure.

The operation amounts of the operating units of the internal combustion engine 10 such as the ignition device 26 and the variable valve timing device 46 may be set in accordance with the operating point of the internal combustion engine 10. The values of the abnormality determination variables P(1) and P(2) are calculated based on the time series data acquired when the rotational speed NE and the charging efficiency η that specify the operating point are both within a predetermined range. Thus, the values of the abnormality determination variables P(1) and P(2) are calculated when the operation amounts of the operating units are within the predetermined range. Therefore, in the present embodiment, the values of the abnormality determination variables P(1) and P(2) are calculated with high accuracy with the mapping having a simple structure, for example, as compared to a configuration in which the values of the abnormality determination variables P(1) and P(2) are calculated even when the operation amounts of the operating units of the internal combustion engine 10 vary greatly.

(4) The time series data that is used as the input to the mapping is acquired from a point in time when the change amount in the target value Af* becomes greater than or equal to the predetermined value ΔAfth. The responsiveness of the upstream air-fuel ratio sensor 84 is determined by the behavior of the upstream detection value Afu corresponding to changes in the air-fuel ratio. Therefore, a mapping may be configured to be triggered, when the change amount of the target value Af* becomes greater than or equal to the predetermined value ΔAfth, to acquire the time series data that is used as the input to the mapping, so that the values of the abnormality determination variables P(1) and P(2) are output based on the behavior of the upstream detection value Afu corresponding to changes in the target value Af*. In the present embodiment, the number of intermediate layers of the neural network and the number of dimensions of input variables of the mapping may be reduced, for example, as compared to a configuration in which the time series data is acquired from an arbitrary time point. As a result, the values of the abnormality determination variables P(1) and P(2) are calculated with high accuracy while simplifying the structure of the mapping.

Second Embodiment

A second embodiment will be described below with reference to FIG. 4, focusing on the differences from the first embodiment.

In the present embodiment, the mapping data 76a includes multiple data for every operating point of the internal combustion engine 10. Each of the mappings is data learned by training data corresponding to the request injection amount Qd and the upstream detection value Afu acquired when the operating point of the internal combustion engine 10 is in the corresponding range.

Figure 4:
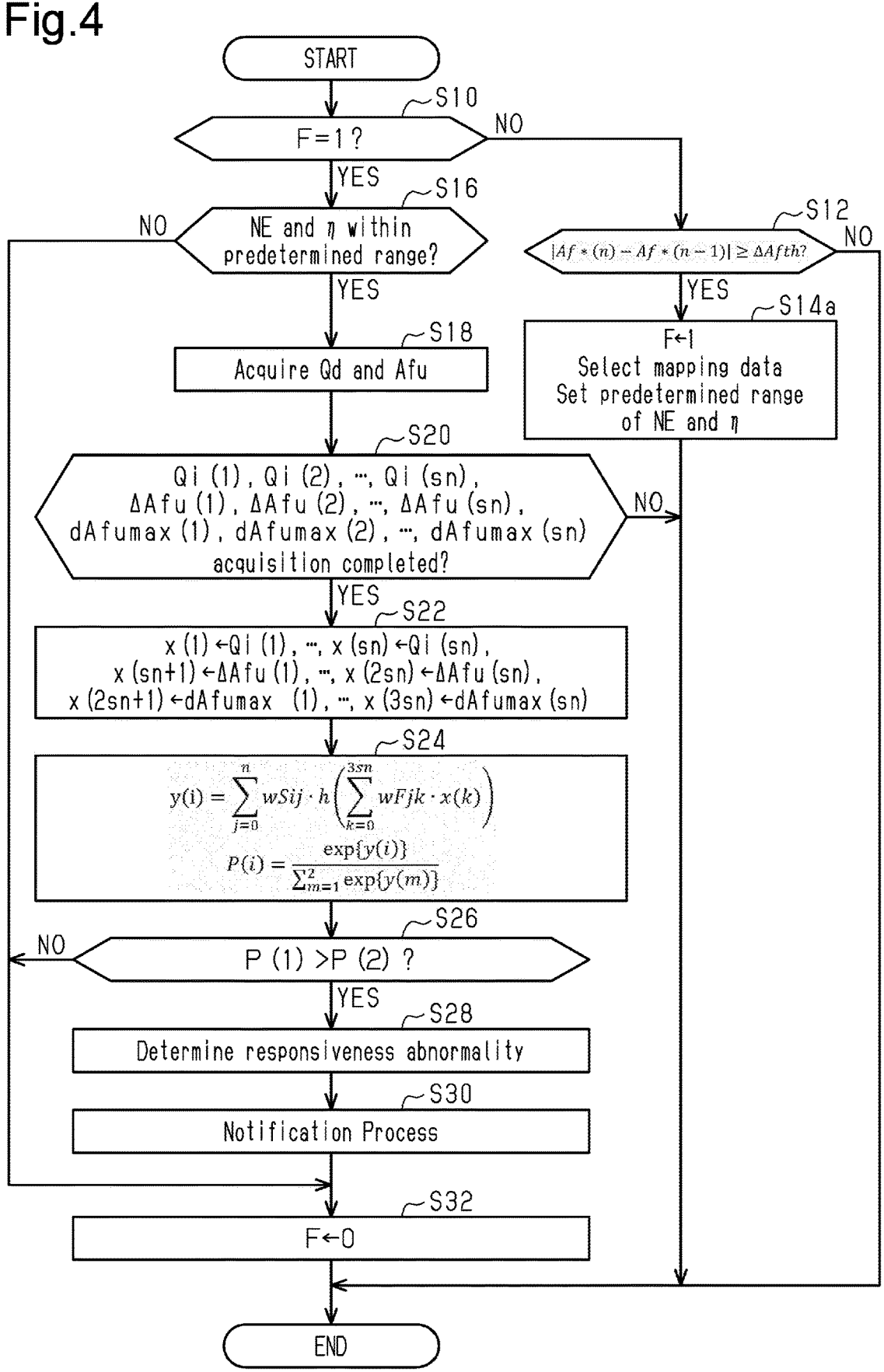
FIG. 4 is a flowchart showing the procedures of a process defined by a second embodiment of an abnormality handling program.

FIG. 4 shows the procedures of a process executed by the control device 70 in the present embodiment. The process shown in FIG. 4 is implemented by the CPU 72 repeatedly executing the abnormality handling program 74a stored in the ROM 74 shown in FIG. 1, for example, in a predetermined cycle. For the sake of convenience, in the process shown in FIG. 4, the same step number is given to the process corresponding to the process shown in FIG. 3.

In the series of processes shown in FIG. 4, when an affirmative determination is made in the process of S12, the CPU 72 assigns one to the start flag F, selects mapping data in accordance with the current operating point of the internal combustion engine 10, and sets a predetermined range in the process of S16 (S14a). More specifically, since the predetermined range selected by the process of S14a varies in accordance with the operating point, there are multiple predetermined ranges, which configure a range of flow rates at which the responsiveness of the upstream air-fuel ratio sensor 84 (air-fuel ratio sensor) is detectable. In the present embodiment, the values of the abnormality determination variables P(1) and P(2) are calculated on condition that the flow rate of the fluid discharged to the exhaust passage 32 is within the predetermined range, which is part of the range of the flow rate at which the responsiveness of the upstream air-fuel ratio sensor 84 (air-fuel ratio sensor) is detectable. When the process of S14a is completed, the CPU 72 temporarily ends the series of processes shown in FIG. 4.

In the present embodiment, the operating point of the internal combustion engine at which the values of the abnormality determination variables P(1) and P(2) are calculated is limited by the single mapping. Thus, multiple mappings, each of which has a simple structure, are used to determine whether the abnormality of the upstream air-fuel ratio sensor 84 is present or absent at various operating points of the internal combustion engine 10. This increases the frequency of determination on the abnormality of the upstream air-fuel ratio sensor 84.

Third Embodiment

A third embodiment will be described below with reference to FIG. 5, focusing on the differences from the first embodiment.

In the present embodiment, the number of input variables to the mapping is increased.

Figure 5:
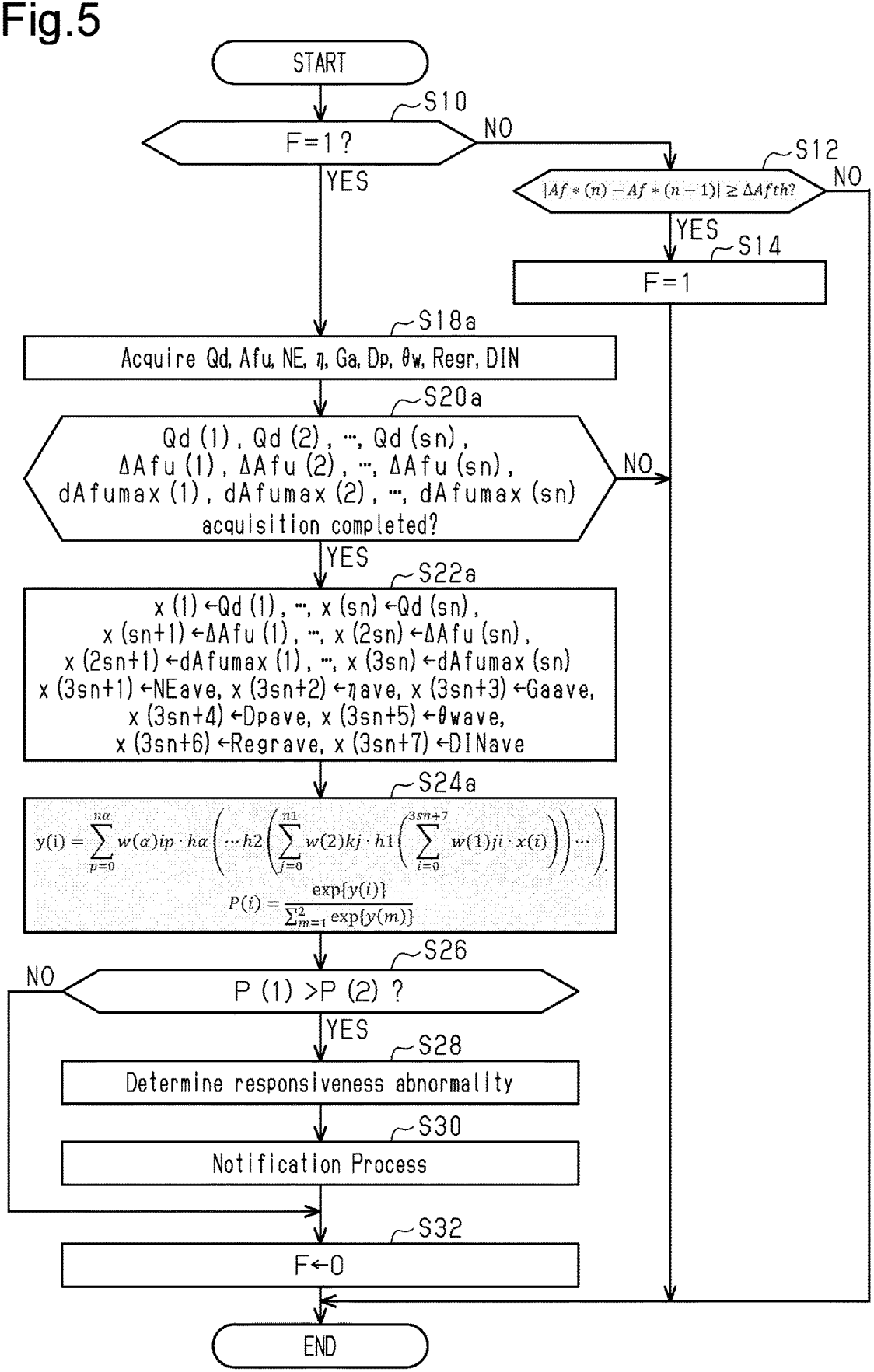
FIG. 5 is a flowchart showing the procedures of a process defined by a third embodiment of an abnormality handling program.

FIG. 5 shows a procedure of a process executed by the control device 70 in the present embodiment. The process shown in FIG. 5 is implemented by the CPU 72 repeatedly executing the abnormality handling program 74a stored in the ROM 74 shown in FIG. 1, for example, in a predetermined cycle. For the sake of convenience, in the process shown in FIG. 5, the same step number is given to the process corresponding to the process shown in FIG. 3.

In the series of processes shown in FIG. 5, when an affirmative determination is made in the process of S10, the CPU 72 samples the rotational speed NE, charging efficiency η, the intake air amount Ga, the purge correction ratio Dp, the opening degree θw, the EGR rate Regr, and the intake phase difference DIN, in addition to the variables (request injection amount Qd and upstream detection value Afu) that are sampled in the process of S18 (S18a). The CPU 72 determines whether or not the acquisition of "sn" pieces of each of the request injection amount Qd, the difference variable ΔAfu, and the time difference maximum value dAfumax is completed (S20a). When it is determined that the acquisition is completed (S20a: YES), the CPU 72 assigns the values to the input variables x(1) to x(3sn+7) of the mapping (S22a). When m=1 to sn, the CPU 72 assigns the request injection amount Qd(m) to the input variable x(m), assigns the difference variable ΔAfu(m) to the input variable x(sn+m), and assigns the time difference maximum value dAfumax(m) to the input variable x(2sn+m). In addition, the CPU 72 assigns the rotational speed average value NEave to the input variable x(3sn+1), assigns the charging efficiency average value ηave to the input variable x(3sn+2), and assigns the intake air amount average value Gaave to the input variable x(3sn+3). Further, the CPU 72 assigns the purge correction ratio average value Dpave to the input variable x(3sn+4), assigns the opening degree average value θwave to the input variable x(3sn+5), assigns the EGR rate average value Regrave to the input variable x(3sn+6), and assigns the intake phase difference average value DINave to the input variable x(3sn+7).

The rotational speed average value NEave, the charging efficiency average value ηave, and the intake air amount average value Gaave, respectively, are the average values of the rotational speed NE, the charging efficiency η, and the intake air amount Ga that are acquired during a period in which "sn" pieces of data of the request injection amount Qd are acquired. Also, the purge correction ratio average value Dpave, the opening degree average value θwave, the EGR rate average value Regrave, and the intake phase difference average value DINave, respectively, are the average values of the target purge rate Rp*, the opening degree θw, the EGR rate Regr, and the intake phase difference DIN that are acquired during a period in which "sn" pieces of data of the request injection amount Qd are acquired.

Then, the CPU 72 inputs the input variables x(1) to x(3sn+7) to a mapping specified by the mapping data 76a to calculate the values of the abnormality determination variables P(1) and P(2), which are the output values of the mapping (S24a). The mapping data 76a is stored in the storage device 76 shown in FIG. 1.

In the present embodiment, the mapping is configured by a neural network that includes "α" intermediate layers. The activation functions h1 to hα of each intermediate layer are ReLU. The activation function of the output layer of the neural network is a softmax function. For example, the value of each node in the first intermediate layer is generated by inputting the input variables x(1) to x(3sn+7) to a linear mapping specified by the coefficient w(1)ji (j=0 to n1, i=0 to 3sn+7) to obtain an output and inputting the output to the activation function h1. That is, when m=1, 2, ..., α, the value of each node of the m-th intermediate layer is generated by inputting the output of a linear mapping specified by the coefficient w(m) to the activation function hm. In this case, n1, n2, ..., nα are the number of nodes in the first intermediate layer, the second intermediate layer, ..., the α-th intermediate layer. In addition, w(1)j0 is one of the bias parameters, and the input variable x(0) is defined as one.

The operations and effects of the present embodiment will be described.

When the target value Af* is changed by the predetermined value ΔAfth or more, the CPU 72 is triggered to sample the rotational speed NE, the charging efficiency η, the intake air amount Ga, the opening degree θw, the EGR rate Regr, and the intake phase difference DIN, in addition to the request injection amount Qd and the upstream detection value Afu. The CPU 72 assigns the values obtained based on the sampling to the input variables x(1) to x(3sn+7)

of the mapping so that the abnormality determination variables P(1) and P(2) are calculated through the neural network.

The charging efficiency average value ηave, the request injection amount Qd, and the purge correction ratio average value Dpave configure an excess amount variable. The excess amount variable corresponds to the excess amount of the actual fuel amount in relation to the amount of fuel that reacts without excess or deficiency with oxygen contained in the fluid flowing into the catalyst 34. More specifically, the excess amount variable corresponds to the excess amount of the actual injection amount in relation to the amount of fuel that sets the air-fuel ratio of the air-fuel mixture in the combustion chamber 22 of the internal combustion engine 10 to the stoichiometric air-fuel ratio. Therefore, information on the lowering level of the responsiveness of the upstream air-fuel ratio sensor 84 is obtained together with the difference variable ΔAfu and the time difference maximum value dAfumax.

The present embodiment described above further has the following operations and effects.

(5) The charging efficiency average value ηave, the request injection amount Qd, and the purge correction ratio average value Dpave are used as inputs to a mapping. Thus, for example, as compared to a configuration in which "Qd−Qb·(1+Dp+LAF)" is defined as the increase amount Qi and used as the input to the mapping, in the present embodiment, the mapping learns an error of the purge correction ratio Dp, and then the values of the abnormality determination variables P(1) and P(2) are calculated.

(6) The opening degree average value θwave is included in the input to the mapping. When the opening degree θw of the WGV 38 differs, the flow state of the fluid flowing toward the side of the upstream air-fuel ratio sensor 84 may differ. The responsiveness of the upstream air-fuel ratio sensor 84 may vary in accordance with the flow state of the fluid. In the present embodiment, the opening degree average value θwave is include in the input to the mapping to calculate the values of the abnormality determination variables P(1) and P(2). This allows for calculation of the values of the abnormality determination variables P(1) and P(2) reflecting the effect of the flow state of the fluid on the responsiveness of the upstream air-fuel ratio sensor 84.

(7) The EGR rate average value Regrave is included in the input to the mapping. Components of the fluid to which the upstream air-fuel ratio sensor 84 is exposed vary in accordance with the flow rate of the exhaust air flowing from the exhaust passage 32 to the intake passage 12 through the EGR passage 50. This may affect the upstream detection value Afu. In the present embodiment, the EGR rate average value Regrave is included in the input to the mapping to calculate the value of the abnormality determination variables P(1) and P(2). This allows for calculation of the values of the abnormality determination variables P(1) and P(2) reflecting the effect on the upstream detection value Afu caused by the flow rate of the exhaust air flowing from the exhaust passage 32 to the intake passage 12 through the EGR passage 50.

(8) The intake phase difference average value DINave is included in the input to the mapping. The internal EGR amount changes in accordance with the valve opening timing of the intake valve 16, and the components of the fluid to which the upstream air-fuel ratio sensor 84 is exposed vary in accordance with the internal EGR amount. Therefore, the valve opening timing of the intake valve 16 may affect the upstream detection value Afu. In addition, when the boost pressure is high, if the valve opening period of the intake valve 16 overlaps the valve opening period of the exhaust valve 30, scavenging occurs in which air drawn in from the intake passage 12 is not subject combustion in the combustion chamber 22 and is discharged to the exhaust passage 32. The upstream detection value Afu changes in accordance with the amount of air that is not subject to combustion and is discharged to the exhaust passage 32. In the present embodiment, the intake phase difference average value DINave is included in the input to the mapping, and the values of the abnormality determination variables P(1) and P(2) are calculated. This allows for calculation of the values of the abnormality determination variables P(1) and P(2) reflecting the effect of the internal EGR amount and the amount of air due to scavenging on the upstream detection value Afu.

(9) The charging efficiency average value ηave and the rotational speed average value NEave that specify the operating point of the internal combustion engine 10 are included in the input to the mapping. The operation amounts of the operating units of the internal combustion engine 10 such as the ignition device 26 and the variable valve timing device 46 may be set in accordance with the operating point of the internal combustion engine 10. Thus, in the present embodiment, the values of the abnormality determination variables P(1) and P(2) are calculated based on the charging efficiency average value ηave and the rotational speed average value NEave that specify the operating point. This allows for calculation of the values of the abnormality determination variables P(1) and P(2) reflecting the operation amounts of the operating units.

(10) The average value of each of the rotational speed NE, the charging efficiency η, the intake air amount Ga, the purge correction ratio Dp, the opening degree θw, the EGR rate Regr, and the intake phase difference DIN is used as the input to the mapping. In the present embodiment, more detailed information on each variable is used as the input to the mapping, while limiting increases in the dimensions of the input variable of the mapping, for example, as compared to a configuration in which each of the rotational speed NE, the charging efficiency η, the intake air amount Ga, the purge correction ratio Dp, the opening degree θw, the EGR rate Regr, and the intake phase difference DIN is used as the input to the mapping.

Fourth Embodiment

A fourth embodiment will be described below with reference to FIGS. 6 and 7, focusing on the differences from the first embodiment.

In the present embodiment, the process for determining whether the abnormality is present or absent is performed outside the vehicle.

Figure 6:
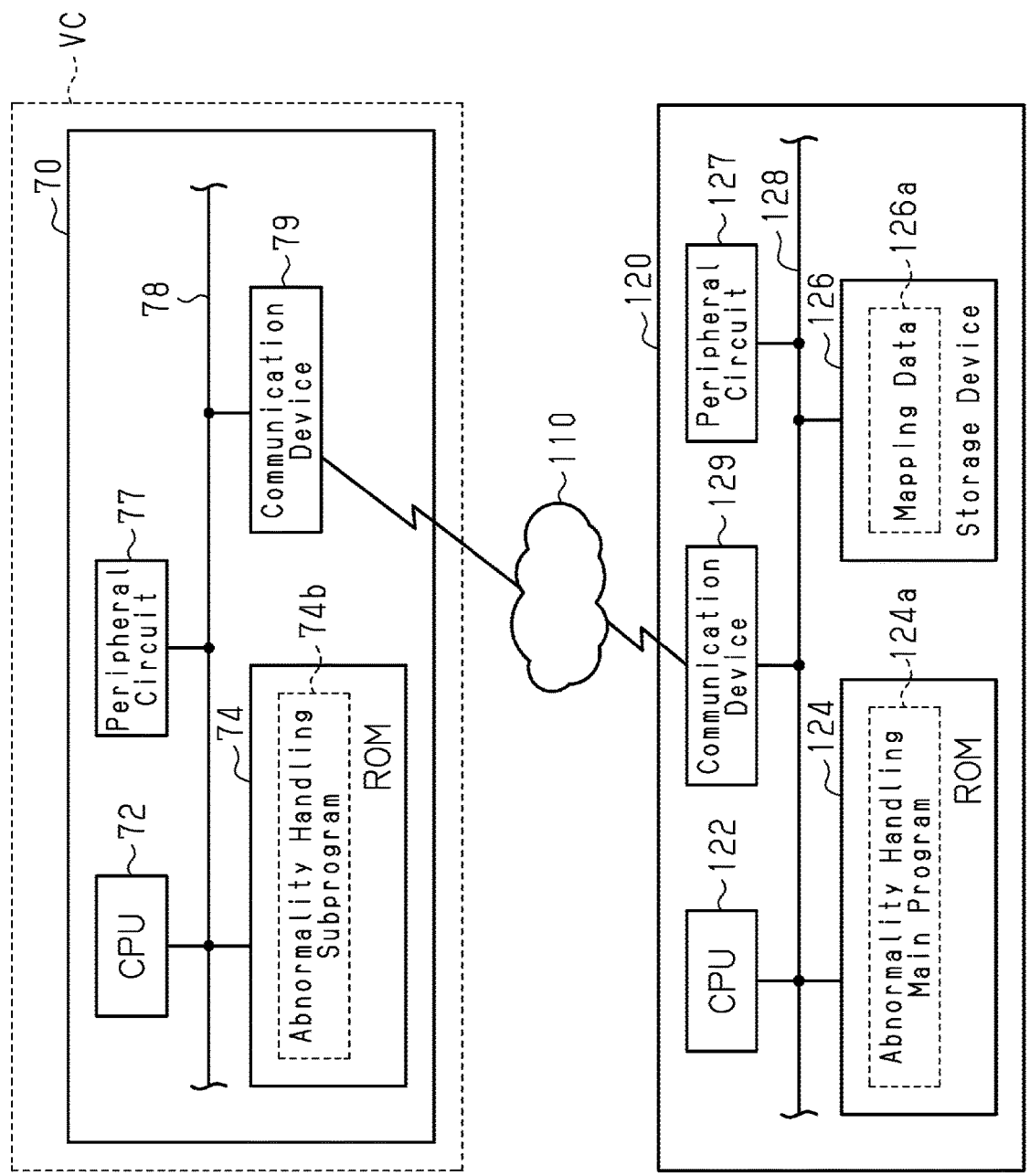
FIG. 6 is a diagram showing the configuration of a fourth embodiment of an abnormality detection system.

FIG. 6 shows an abnormality detection system according to the present embodiment. For the sake of convenience, in FIG. 6, the same reference numeral is assigned to the member corresponding to the member shown in FIG. 1.

FIG. 6 shows the control device 70 that is arranged in the vehicle VC and includes a communication device 79. The communication device 79 is configured to communicate with the center 120 through a network 110 located outside the vehicle VC.

The center 120 analyzes data transmitted from multiple vehicles VC. The center 120 includes a CPU 122, a ROM 124, a storage device 126, a peripheral circuit 127, and a communication device 129, which are configured to communicate with each other through a local network 128. The storage device 126 stores mapping data 126a.

Figure 7:
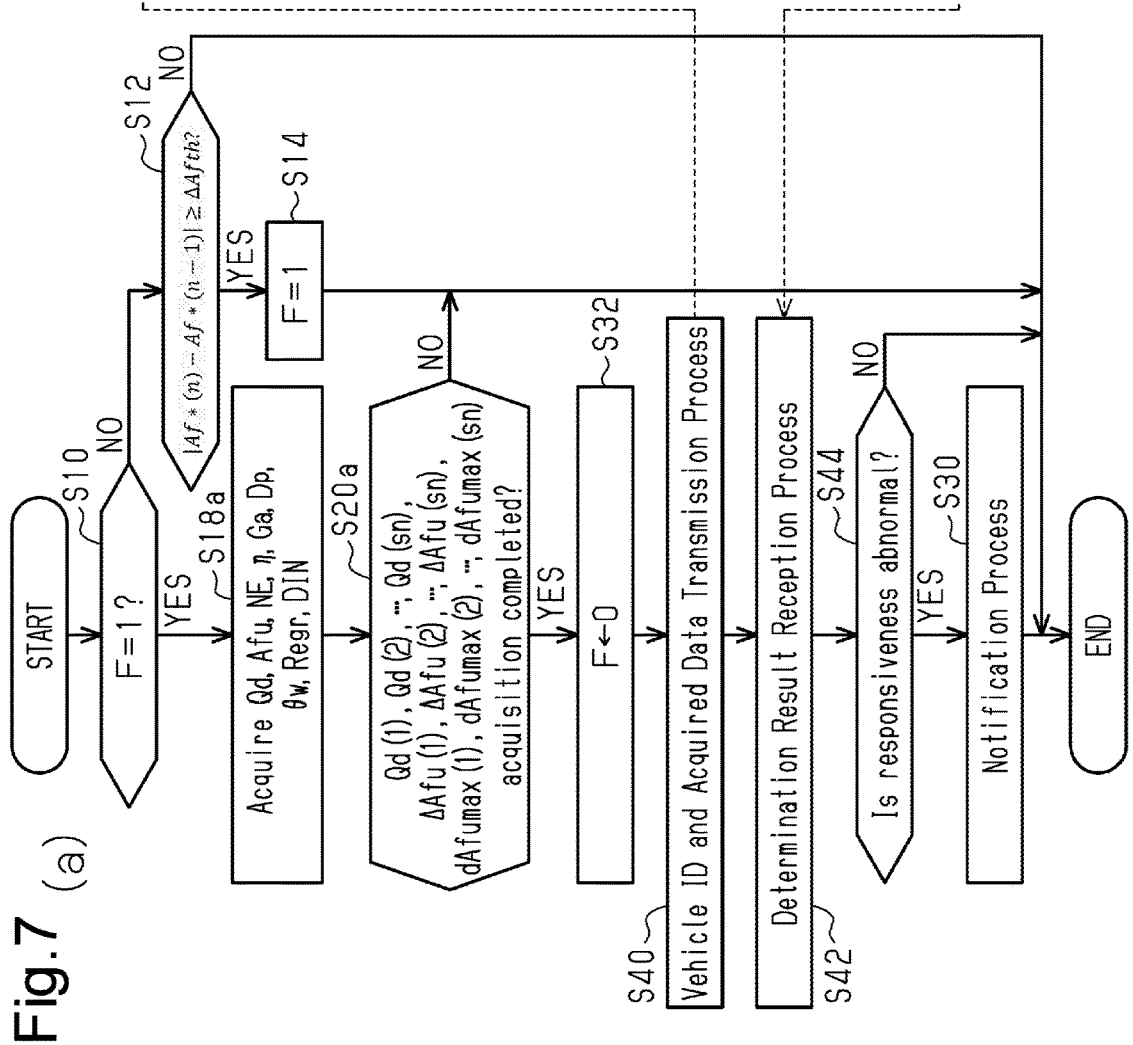
FIG. 7 is a flowchart including parts (a) and (b) showing the procedures of a process executed by an abnormality detection system.

FIG. 7 shows the procedures of a process executed by the system shown in FIG. 6. The process shown in (a) in FIG. 7 is implemented by the CPU 72 executing the abnormality handling subprogram 74b stored in the ROM 74 of the vehicle VC shown in FIG. 6. The process shown in (b) in FIG. 7 is implemented by the CPU 122 executing the abnormality handling main program 124a stored in the ROM 124 of the center 120 shown in FIG. 6. For the sake of convenience, in FIG. 7, the same step number is given to the process corresponding to the process shown in FIG. 5. In the following, the process shown in FIG. 7 will be described along a time series of the process for determining presence or absence of the abnormality.

As shown in (a) in FIG. 7, when an affirmative determination is made in the process of S20a, the CPU 72 sets the start flag F to zero (S32). Then, the CPU 72 operates the communication device 79 so that data, the acquisition of which is determined to be completed in the process of S20a, is transmitted to the center 120 together with a vehicle ID (S40). The vehicle ID is identification information of the vehicle VC.

As shown in (b) in FIG. 7, the CPU 122 of the center 120 receives the transmitted data (S50) and executes the processes of S22a, S24a, and S26 (S28). In the process of S24a, the CPU 122 uses a mapping specified by the mapping data 126a. When a negative determination is made in the process of S26 or when the process of S28 is completed, the CPU 122 operates the communication device 129 to transmit a signal related to the determination result to the vehicle VC that has transmitted the data received by the CPU 122 in the process of S50 (S52). This temporarily ends the series of processes shown in (b) in FIG. 7. As shown in (a) in FIG. 7, the CPU 72 of the vehicle VC receives the determination result (S42), and determines whether or not the received determination result indicates that it is determined that the upstream air-fuel ratio sensor 84 has an abnormality (S44). When it is determined that the upstream air-fuel ratio sensor 84 has an abnormality (S44: YES), the CPU 72 executes the process of S30. When the process of S30 is completed or a negative determination is made in the process of S44, the CPU 72 temporarily ends the series of processes shown in (a) In FIG. 7.

In the present embodiment, the center 120 executes the process of S24a. This reduces the calculation load on the CPU 72 of the vehicle VC.

Correspondence Relationship

Correspondence relationship between the items in the embodiments described above and the items described in "Summary" is as follows. Hereinafter, the correspondence relationship is shown with each number of the aspects described in "Summary."

[1] to [4] The "execution device" corresponds to the CPU 72 and the ROM 74.

The "excess amount variable" corresponds to the increase amount Qi.

The "first predetermined period" corresponds to the sampling period of Qd(1) to Qd(sn).

The "air-fuel ratio detection variable" corresponds to the difference variable ΔAfu and the time difference maximum value dAfumax.

The "second predetermined period" corresponds to the sampling period of ΔAfu(1) to ΔAfu(sn) or dAfumax(1) to dAfumax(sn).

The "acquisition process" corresponds to the processes of S18 and S20 and the processes of S18a and S20a.

The "calculation process" corresponds to the processes of S22 and S24 and the processes of S22a and S24a.

The "handling process" corresponds to the processes of S26 to S30.

[5] The "adjustment device" corresponds to the pump 66.

The "purge variable" corresponds to the purge correction ratio average value Dpave.

[6] The "flow path variable" corresponds to the opening degree average value θwave.

[7] The "EGR variable" corresponds to the EGR rate average value Regrave.

[8] The "valve characteristic variable" corresponds to the intake phase difference average value DINave.

[9] Example 9 corresponds to the process of S16 in FIGS. 3 and 4.

[10] Example 10 corresponds to execution of the processes of S18 and S18a when an affirmative determination is made in the process of S10.

[11] The "selection process" corresponds to the process of S14a.

[12] The "abnormality detection system" corresponds to the control device 70 and the center 120.

The "signal based on the value of the abnormality determination variable" corresponds to a signal including a determination result.

The "first execution device" corresponds to the CPU 72 and the ROM 74.

The "second execution device" corresponds to the CPU 122 and the ROM 124.

The "acquisition process" corresponds to the processes of S18a and S20a.

The "vehicle-side transmission process" corresponds to the process of S40, and the "vehicle-side reception process" corresponds to the process of S42.

The "external-side reception process" corresponds to the process of S50, and the "external-side transmission process" corresponds to the process of S52.

[13] The "data analysis device" corresponds to the center 120.

[14] The "control device for an internal combustion engine" corresponds to the control device 70.

[15] The "computer" corresponds to the CPU 72 and ROM 74, and the CPU 72, CPU 122, ROM 74, and ROM 124.

Other Embodiments

The embodiments may be modified and implemented as below. The embodiments and the following modified examples can be implemented by being combined with each other within a scope not technically conflicting each other.

First Predetermined Period and Second Predetermined Period

In the embodiments described above, the first predetermined period, in which the excess amount variable such as the increase amount Qi is sampled, is the same as the second predetermined period, in which the air-fuel ratio detection variable such as the difference variable ΔAfu is sampled. However, there is no limitation to such a configuration. For example, the second predetermined period may be delayed from the first predetermined period. Further, the first predetermined period and the second predetermined period do not necessarily have to have the same length.

Excess Amount Variable

The excess amount variable is not limited to the increase amount Qi and may be its average value. Alternatively, for example, an increase ratio may be used. The increase ratio is a ratio of the actual fuel amount in relation to the amount of fuel that reacts without excess or deficiency with oxygen contained in the fluid discharged to the exhaust passage 32. The increase ratio may be obtained, for example, by the following calculation.

$$\{Qd-Qb\cdot(1+LAF\cdot Dp)\}/Qb\cdot(1+LAF\cdot Dp)$$

As shown in FIGS. 3 and 4, when the acquisition process of the input to mapping for calculating the abnormality determination variables P(1) and P(2) is limited to a specific operating point, it may be assumed that the flow rate of the fluid flowing into the exhaust passage 32 is substantially constant so that the excess amount variable is configured by only the increase ratio. However, even with the limitation to a specific operating point, the excess amount variable may be configured by the charging efficiency η and the increase rate, instead of configuring the excess amount variable by only the increase ratio. In this case, time series data of the charging efficiency η having the "sn" pieces of data, which is the same as the increase ratio, may be included in the input to the mapping. However, there is no limitation to such a configuration. For example, a single charging efficiency η or an average value of the single charging efficiency η may be included in the input to the mapping. In this case, it is assumed that the charging efficiency η is a single value that is input to the mapping during the sampling period of "sn" pieces of the increase ratio. Even when the charging efficiency η is used as the time series data, the number of the charging efficiency η does not necessarily have to be equal to the number of data of the increase ratio. For example, the time series data having a smaller number of data than the increase ratio may be used as the time series data of the charging efficiency η. In this case, the time series data of the average value of the charging efficiency η may be input to the mapping instead of directly inputting the time series data of the sampling value of the charging efficiency η to the mapping.

In the processes of FIGS. 5 and 7, the excess amount variable is configured by the request injection amount Qd, the purge correction ratio average value Dpave, and the charging efficiency average value ηave. However, there is no limit to such a configuration. For example, the excess amount variable may be configured by the purge concentration learning value Lp, the target purge rate Rp*, the intake air amount Ga, the rotational speed NE, and the request injection amount Qd.

In the processes of FIGS. 5 and 7, the time series data of the excess amount variable is configured by the time series data of the request injection amount Qd, the purge correction ratio average value Dpave and the charging efficiency average value ηave as the input to the mapping. However, there is no limit to such a configuration. For example, the time series data of the excess amount variable may be configured by the time series data of the request injection amount Qd, the time series data of the purge correction ratio Dp, and the time series data of the charging efficiency η, each of which includes "sn" pieces of data. However, the number of pieces of data configuring the time series data does not necessarily have to be the same.

Temporally-Varying Variable

In the embodiments described above, the temporally-varying variable is the time difference maximum value dAfumax. However, there is no limit to such a configuration. For example, an average value of absolute values of the time difference values dAfu may be used. Alternatively, a single time difference value dAfu may be used.

Air-Fuel Ratio Detection Variable

In the embodiments described above, both the time difference maximum value dAfumax, which is the temporally-varying variable, and the difference variable ΔAfu are used to calculate the abnormality determination variable P. However, there is no limit to such a configuration. For example, only one of the temporally-varying variable and the difference variable ΔAfu may be used. For example, the upstream detection value Afu or the time series data of its average value may be used as the input to the neural network described above.

As described in "Air-Fuel Ratio Sensor on which Abnormality Detection is Performed", when the abnormality detection is performed on the downstream air-fuel ratio sensor 86, the air-fuel ratio detection variable is a variable based on the downstream detection value Afd.

Purge Variable

In the processes of S22a and S24a, the purge correction ratio average value Dpave is used as the purge variable, and the single purge correction ratio average value Dpave is used as the input of the neural network. However, there is no limitation to such a configuration. For example, the purge variable may be a purge correction ratio Dp, and its time series data may be used as the input of a neural network. Alternatively, for example, a single purge correction ratio Dp may be used as the input of a neural network.

The purge variable is not limited to the purge correction ratio average value Dpave and the purge correction ratio Dp. For example, as described above in "Excess Amount Variable," the purge variable may be configured using the target purge rate Rp*, the purge concentration learning value Lp, and the intake air amount Ga.

Flow Path Variable

In the processes of S22a and S24a, the opening degree average value θwave is used as the flow path variable, which is a variable related to the flow path cross-sectional area of the bypass passage 36 that bypasses the forced induction device 14. The single opening degree average value θwave is used as the input of the neural network. However, there is no limitation to such a configuration. For example, the flow path variable may be the opening degree θw, and its time series data may be the input to the neural network. Alternatively, for example, a single opening degree θw may be the input to the neural network.

EGR Variable

In the processes of S22a and S24a, the EGR rate average value Regrave is used as the EGR variable, and the single EGR rate average value Regrave is used as the input of the neural network. However, there is no limitation to such a configuration. For example, the EGR variable may be an EGR rate Regr, and its time series data may be the input to a neural network. Alternatively, for example, a single EGR rate Regr may be the input to the neural network.

Valve Characteristic Variable

In the processes of S22a and S24a, the intake phase difference average value DINave is used as the valve characteristic variable, and the single intake phase difference average value DINave is used as the input of the neural network. However, there is no limitation to such a configuration. For example, the valve characteristic variable may be an intake phase difference DIN, and its time series data may be the input to a neural network. Alternatively, for example, a single intake phase difference DIN may be the input to the neural network. Further, for example, in the configuration described above, the target intake phase difference DIN* may be used instead of the intake phase difference DIN.

As described below in "Valve Characteristic Variable Device," when a device configured to change a lift amount is used as the valve characteristic variable device, a variable related to the lift amount is used as the valve characteristic variable.

Operating Point Variable

The operating point variables are not limited to the rotational speed NE and the charging efficiency η. For example, the intake air amount Ga and the rotational speed NE may be used. Furthermore, for example, as described below in "Internal Combustion Engine," when a compression ignition type internal combustion engine is used, the injection amount and the rotational speed NE may be operating point variables. The operating point variable does not necessarily have to be used as the input of mapping.

Acquisition Process

The acquisition process is not limited to the sampling of the value of the variable from a point in time when the target value Af* is switched from one of rich and lean to the other by the sub-feedback process M46. For example, the value of the variable may be sampled from a point in time when the fuel cut process is started. Further, for example, the value of the variable may be sampled from a point in time when the target value Af* is switched to a value dedicated to abnormality determination.

The configuration is not limited to a sampling of the value of the variable from a point in time when the air-fuel ratio changes. Even without such conditions, abnormality determination is performed with high accuracy, for example, when a sufficient number of time series data serving as the input to the mapping is ensured.

Multiple Types of Mapping Data

In the process of FIG. 4, different mapping data are used for each rotational speed NE and charging efficiency η serving as the operating point variable. However, the operating point variable is not limited to such a configuration and may be changed to that described in "Operating Point Variable."

The multiple types of mapping data are not limited to mapping data for each operating point variable. For example, different mapping data may be used for each intake air amount Ga. Moreover, there is no limitation to a configuration having mapping data for each variable related to the flow rate of the fluid flowing into the air-fuel ratio sensor side from the upstream side of the air-fuel ratio sensor in the exhaust passage. For example, different mapping data may be provided for each charging efficiency η and base injection amount Qb regardless of the rotational speed NE.

As exemplified in the above embodiments, the input of mapping data when multiple types of mapping data are provided may be configured so that a variable used to select mapping data is used as the input to the mapping. For example, as shown in FIG. 4, even when different mapping data are used for each operating point variable, the operating point variable may be included in the input to the mapping.

External-Side Transmission Process

In the process of S52 of FIG. 7, the determination result is transmitted. However, there is no limitation to such a configuration. For example, the values of the abnormality determination variables P(1) and P(2) may be transmitted from the center 120 to the vehicle VC.

Input to Mapping

In FIGS. 5 and 7, the rotational speed average value NEave, the charging efficiency average value ηave, and the intake air amount average value Gaave are used as the input to the mapping. However, there is no limitation to such a configuration. For example, since the intake air amount average value Gaave is obtained from the rotational speed average value NEave and the charging efficiency average value ηave, the intake air amount average value Gaave may be deleted from the input to the mapping. However, there is no limitation to such a configuration. One or more of the input variables x that are used in the process of S22a may be omitted.

For example, the input to the neural network and the input to the regression equation described below in "Machine Learning Algorithm" are not limited to those in which each dimension is formed by a single physical quantity. For example, in the above embodiments, different types of physical quantities used as the input to the mapping are directly input to the neural network or the regression equation. Instead, one or more of the different types of the physical quantities may be analyzed for their main components, and the main components may be directly input to the neural network or the regression equation. However, when main components are input to the neural network or the regression equation, the main components do not necessarily have to be only a portion of the input to the neural network or the regression equation. The entirety of the input may be the main components. When main components are input to the mapping, the mapping data 76a and 126a includes data specifying a mapping for determining the main components.

Mapping Data

For example, according to the description of FIGS. 5 and 7, the number of intermediate layers in the neural network is expressed as being more than two layers. However, there is no limitation to such a configuration.

In the above embodiments, the activation function h, h1, h2, . . . hα of the intermediate layers of the neural network are ReLU, and the activation function of the output of the neural network is a softmax function. However, there is no limitation to such a configuration. For example, the activation function h, h1, h2, . . . hα of the intermediate layers of the neural network may be hyperbolic tangents. Furthermore, for example, the activation functions h, h1, h2, . . . hα of the intermediate layers may be logistic sigmoid functions.

For example, the activation function of the output of the neural network may be a logistic sigmoid function. In this case, for example, the number of nodes in the output layer may be one, and the output variable serving as the abnormality determination variable may be the probability that the abnormality of the upstream air-fuel ratio sensor 84 is present. In this case, when the value of the output variable is greater than or equal to a predetermined value, it may be determined that the abnormality is present so that whether the abnormality of the upstream air-fuel ratio sensor 84 is present or absent is determined.

Machine Learning Algorithm

The machine learning algorithm is not limited to one that uses a neural network. For example, a regression equation may be used. This corresponds to the neural network having no intermediate layer. Hence, the mapping data may include data learned by machine learning.

Data Analysis Device

For example, the processes of S22 and S24 illustrated in FIG. 3 may be executed by the center 120.

The process in (b) in FIG. 7 may be executed by, for example, a portable terminal carried by the user.

Execution Device

The execution device is not limited to a device that includes the CPU 72 (122) and the ROM 74 (124) and executes the software processes. For example, a dedicated hardware circuit (e.g., ASIC etc.) that processes at least some of the software processes executed in the above embodiments may be provided. In other words, the execution device may have any one of the following configurations (a) to (c). Configuration (a) includes a processing device that executes all of the above processes according to a program, and a program storage device (including a non-transitory computer-readable storage medium) such as a ROM that stores the program. Configuration (b) includes a processing device and a program storage device that execute some of the above processes according to a program, and a dedicated hardware circuit that performs the remaining processes. Configuration (c) includes a dedicated hardware circuit that executes all of the above processes. A plurality of software execution devices, each of which includes a processing device and a program storage device, may be provided. A plurality of dedicated hardware circuits may be provided.

Storage Device

In the embodiments described above, the storage device storing the mapping data 76a, 126a and the storage device (ROM 74, 124) storing the abnormality handling program 74a and the abnormality handling main program 124a are separate storage devices. However, there is no limitation to such a configuration.

Computer

When a computer is configured by an execution device such as the CPU 72 and the ROM 74 mounted on the vehicle and an execution device such as the CPU 122 and the ROM 124 provided in the center 120, the processes assigned to each execution device is not limited to those exemplified in the above embodiments and the modified examples. For example, the CPU 122 may execute the process of S24a up to the process of calculating the values of the determination prototype variables y(1) and y(2), and transmit the values of the determination prototype variables y(1) and y(2) from the center 120 to the vehicle. Then, the CPU 72 may calculate the values of the abnormality determination variables P(1) and P(2).

The computer is not limited to one configured by the execution device such as the CPU 72 and the ROM 74 mounted on the vehicle and the execution device such as the CPU 122 and the ROM 124 provided in the center 120. For example, a computer that executes a method for detecting an abnormality of an air-fuel ratio sensor may be configured by an execution device mounted on a vehicle, an execution device provided in the center 120, and an execution device such as a CPU and a ROM installed in a portable terminal carried by the user. This may be implemented, for example, when the process of S52 in FIG. 7 corresponds to a transmission process from the center 120 to the portable terminal carried by the user, and the processes of S42, S44, and S30 are executed by the portable terminal.

Air-Fuel Ratio Sensor on which Abnormality Detection is Performed

In the above embodiments, the abnormality detection is performed on the upstream air-fuel ratio sensor 84. However, there is no limitation to such a configuration. For example, the abnormality detection may be performed on the downstream air-fuel ratio sensor 86.

Valve Characteristic Variable Device

The valve characteristic variable device that changes the characteristics of the intake valve 16 is not limited to the variable valve timing device 46. For example, a device that changes the lift amount of the intake valve 16 may be the valve characteristic variable device. In this case, the parameter indicating the valve characteristic of the intake valve 16 is, for example, the lift amount instead of the intake phase difference DIN.

Adjustment Device

For example, as described below in "Internal combustion engine," when the internal combustion engine 10 is not equipped with a forced induction device, a purge control valve that adjusts the flow path cross-sectional area of the purge passage 64 may be provided as an adjustment device that adjusts the flow rate of the fuel vapor flowing in from the canister into the intake passage.

Internal Combustion Engine

The internal combustion engine does not necessarily have to include a forced induction device. Also, the internal combustion engine does not necessarily have to include an EGR passage.

In the embodiments described above, the in-cylinder injection valve that injects fuel into the combustion chamber 22 is exemplified as the fuel injection valve. However, there is no limitation to such a configuration. The fuel injection valve may be, for example, a port injection valve that injects fuel into the intake passage 12. For example, both the port injection valve and the in-cylinder injection valve may be provided.

The internal combustion engine is not limited to a spark ignition type internal combustion engine, and may for example, be a compression ignition type internal combustion engine that uses, for example, diesel as fuel.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An abnormality detection device for an air-fuel ratio sensor that is provided in an exhaust passage of an internal combustion engine, the abnormality detection device, comprising:
   a storage device; and
   an execution device, wherein
   the storage device stores mapping data specifying a mapping,
   the mapping outputs an abnormality determination variable using first time series data and second time series data as an input,
   the first time series data is time series data of an excess amount variable in a first predetermined period,
   the excess amount variable is a variable corresponding to an excess amount of fuel actually discharged to the exhaust passage in relation to an amount of fuel reacting without excess or deficiency with oxygen contained in a fluid discharged to the exhaust passage,
   the second time series data is time series data of an air-fuel ratio detection variable in a second predetermined period,
   the air-fuel ratio detection variable is a variable related to a detection value of the air-fuel ratio sensor,
   the abnormality determination variable is a variable related to presence and absence of an abnormality that decreases responsiveness of the air-fuel ratio sensor, the execution device is configured to execute an acquisition process, a calculation process, and a handling process, in the acquisition process, the execution device acquires the first time series data and the second time series data, in the calculation process, the execution device inputs the first time series data and the second time series data, which are acquired by the acquisition process, to the mapping to calculate a value of the abnormality determination variable, and in the handling process, when the calculation result of the calculation process indicates the abnormality, the execution device operates predetermined hardware to handle the abnormality.

2. The abnormality detection device according to claim 1, wherein
the air-fuel ratio detection variable includes a temporally-varying variable, and
the temporally-varying variable is a variable related to temporal variation of the detection value in a sampling period for a value of each air-fuel ratio detection variable configuring the second time series data.

3. The abnormality detection device according to claim 1, wherein
the air-fuel ratio detection variable includes a difference variable, and
the difference variable is a variable related to a difference between a local maximum of the detection value and a local minimum of the detection value in a sampling period for a value of each air-fuel ratio detection variable configuring the second time series data.

4. The abnormality detection device according to claim 1, wherein the excess amount variable is determined based on an actual amount of fuel injected by a fuel injection valve of the internal combustion engine.

5. The abnormality detection device according to claim 1, wherein
the internal combustion engine includes:
a canister configured to collect fuel vapor from a fuel tank, the fuel tank storing fuel that is to be injected from a fuel injection valve;
a purge passage configured to connect the canister to an intake passage of the internal combustion engine; and
an adjustment device configured to adjust a flow rate of the fuel vapor, the fuel vapor flowing into the intake passage from the canister through the purge passage, and
the excess amount variable includes a purge variable that is a variable related to the flow rate of the fuel vapor.

6. The abnormality detection device according to claim 1, wherein
the internal combustion engine includes a forced induction device upstream of the air-fuel ratio sensor in the exhaust passage,
the exhaust passage includes a bypass passage that bypasses the forced induction device,
the bypass passage has a flow path cross-sectional area that is adjusted by a wastegate valve,
the input to the mapping includes a flow path variable that is a variable related to the flow path cross-sectional area of the bypass passage,
the acquisition process includes a process that acquires the flow path variable, and
the calculation process includes a process that calculates the value of the abnormality determination variable based on an output of the mapping in which the flow path variable is further included in the input to the mapping.

7. The abnormality detection device according to claim 1, wherein
the internal combustion engine includes:
an exhaust gas recirculation (EGR) passage configured to connect the exhaust passage to an intake passage; and
an EGR valve configured to adjust a flow rate of a fluid flowing from the exhaust passage into the intake passage through the EGR passage,
the input to the mapping includes an EGR variable that is a variable related to the flow rate of the fluid flowing into the intake passage from the exhaust passage,
the acquisition process includes a process that acquires the EGR variable, and
the calculation process includes a process that calculates the value of the abnormality determination variable based on an output of the mapping in which the EGR variable is further included in the input to the mapping.

8. The abnormality detection device according to claim 1, wherein
the internal combustion engine includes a valve characteristic variable device configured to change a valve characteristic of an intake valve,
the input to the mapping includes a valve characteristic variable that is a variable related to the valve characteristic,
the acquisition process includes a process that acquires the valve characteristic variable, and
the calculation process includes a process that calculates the value of the abnormality determination variable based on an output of the mapping in which the valve characteristic variable is further included in the input to the mapping.

9. The abnormality detection device according to claim 1, wherein the calculation process includes a process that calculates the value of the abnormality determination variable based on the first time series data and the second time series data acquired by the acquisition process on condition that a flow rate of the fluid discharged to the exhaust passage is within a predetermined range.

10. The abnormality detection device according to claim 1, wherein
the exhaust passage is provided with a catalyst,
the air-fuel ratio sensor is an upstream air-fuel ratio sensor disposed at an upstream side of the catalyst in the exhaust passage,
a downstream air-fuel ratio sensor is provided at a downstream side of the catalyst in the exhaust passage,
the execution device executes a main feedback process and a sub-feedback process,
the main feedback process feedback-controls the detection value of the upstream air-fuel ratio sensor to a target value,
when the detection value of the downstream air-fuel ratio sensor is richer than a stoichiometric air-fuel ratio by a predetermined amount or more, the sub-feedback process causes the target value to be leaner than the stoichiometric air-fuel ratio,
when the detection value of the downstream air-fuel ratio sensor is leaner than the stoichiometric air-fuel ratio by a predetermined amount or more, the sub-feedback process causes the target value to be richer than the stoichiometric air-fuel ratio, and in synchronization with a point in time when the target value is switched from rich to lean and a point in time when the target value is switched from lean to rich, the acquisition process sets the first predetermined period and sets the second predetermined period after the first predetermined period.

11. The abnormality detection device according to claim 1, wherein
the storage device stores multiple types of mapping data as the mapping data,
the calculation process includes a selection process, and
the selection process selects one of the multiple types of mapping data as mapping data that is used to calculate the value of the abnormality determination variable.

12. An abnormality detection system for an air-fuel ratio sensor, the abnormality detection system, comprising:
the execution device and the storage device according to claim 1, wherein
the execution device includes a first execution device and a second execution device,
the first execution device is mounted on a vehicle and configured to execute the acquisition process, a vehicle-side transmission process, a vehicle-side reception process, and the handling process,
in the vehicle-side transmission process, the first execution device transmits data acquired by the acquisition process to outside the vehicle,
in the vehicle-side reception process, the first execution device receives a signal based on the value of the abnormality determination variable calculated by the calculation process,
the second execution device is disposed outside the vehicle and configured to execute an external-side reception process, the calculation process, and an external-side transmission process,
in the external-side reception process, the second execution device receives the data transmitted by the vehicle-side transmission process, and
in the external-side transmission process, the second execution device transmits the signal based on the value of the abnormality determination variable calculated by the calculation process to the vehicle.

13. A data analysis device, comprising:
the second execution device and the storage device according to claim 12.

14. A control device for an internal combustion engine, the control device, comprising:
the first execution device according to claim 12.

15. A method for detecting an abnormality of an air-fuel ratio sensor that is provided in an exhaust passage of an internal combustion engine, the method comprising, as various processes executed by a computer:
storing mapping data specifying a mapping, the mapping outputting an abnormality determination variable using first time series data and second time series data as an input;
acquiring the first time series data, the first time series data being time series data of an excess amount variable in a first predetermined period, the excess amount variable being a variable corresponding to an excess amount of a fuel actually discharged to the exhaust passage in relation to an amount of fuel reacting without excess or deficiency with oxygen contained in a fluid discharged to the exhaust passage;
acquiring the second time series data, the second time series data being time series data of an air-fuel ratio detection variable in a second predetermined period, and the air-fuel ratio detection variable being a variable related to a detection value of the air-fuel ratio sensor;
calculating a value of the abnormality determination variable by inputting the acquired first time series data and the acquired second time series data to the mapping, the abnormality determination variable being a variable related to presence and absence of an abnormality that decreases responsiveness of the air-fuel ratio sensor; and
operating predetermined hardware to handle the abnormality when the abnormality determination variable indicates the abnormality.

* * * * *